US010080443B2

(12) United States Patent
Terhune et al.

(10) Patent No.: US 10,080,443 B2
(45) Date of Patent: Sep. 25, 2018

(54) INFANT CHAIRS

(71) Applicant: Thorley Industries LLC, Pittsburgh, PA (US)

(72) Inventors: Robert Terhune, Glenshaw, PA (US); Elijah M. Wiegmann, Natrona Heights, PA (US); Jordan Zito, Apollo, PA (US); Robert Stutler, Pittsburgh, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 0 days.

(21) Appl. No.: 15/390,040

(22) Filed: Dec. 23, 2016

(65) Prior Publication Data

US 2017/0105546 A1 Apr. 20, 2017

Related U.S. Application Data

(63) Continuation of application No. 14/800,046, filed on Jul. 15, 2015, now Pat. No. 9,560,919.

(60) Provisional application No. 62/031,895, filed on Aug. 1, 201.

(51) Int. Cl.

| A47B 83/02 | (2006.01) |
|---|---|
| A47D 1/00 | (2006.01) |
| A47D 15/00 | (2006.01) |
| A47B 13/16 | (2006.01) |
| F16B 1/00 | (2006.01) |

(52) U.S. Cl.
CPC .............. *A47D 1/008* (2013.01); *A47B 13/16* (2013.01); *A47D 1/004* (2013.01); *A47D 1/006* (2013.01); *A47D 15/006* (2013.01); *F16B 1/00* (2013.01); *F16B 2001/0035* (2013.01)

(58) Field of Classification Search
CPC ....... A47D 1/004; A47D 1/008; A47D 15/006
USPC ....... 297/135, 148, 149, 150, 151, 152, 153, 297/154, 155, 156, 160, 161, 162
See application file for complete search history.

(56) References Cited

U.S. PATENT DOCUMENTS

| 3,635,522 A | 1/1972 | Kerwit |
| 3,729,037 A | 4/1973 | Dare |
| 5,160,183 A | 11/1992 | Rusyniak |
| 5,254,007 A | 10/1993 | Eagan |
| 5,558,391 A | 9/1996 | Chavous |
| 5,586,800 A | 12/1996 | Triplett |

(Continued)

FOREIGN PATENT DOCUMENTS

| ES | 1071336 U | 5/2010 |
| KR | 20120134343 A | 12/2012 |

*Primary Examiner* — Rodney Barnett White
(74) *Attorney, Agent, or Firm* — K&L Gates LLP

(57) ABSTRACT

An infant-supporting chair. The chair may include a seat and a tray assembly that includes a releasable mechanical latching system for retainingly engaging the tray assembly to the seat when the tray assembly is in a latching position. The chair may further include a tray guidance system that is configured to guide the tray assembly into the latching position. The tray guidance system may comprise at least one magnet feature in the seat and at least one other magnet feature in the tray assembly. Once latched, the tray may be slidably positioned relative to the seat while remaining latched thereto. The seat may be movably supported on a frame assembly and a seat positioning system may be included to selectively retain the seat at desired heights on the frame assembly.

11 Claims, 38 Drawing Sheets

(56) References Cited

U.S. PATENT DOCUMENTS

| | | |
|---|---|---|
| 5,975,628 A | 11/1999 | Russell |
| 6,179,377 B1 | 1/2001 | Harper |
| 6,216,605 B1 | 4/2001 | Chapman |
| 6,578,496 B2 | 6/2003 | Guard et al. |
| 6,604,786 B1 | 8/2003 | Benden et al. |
| 6,637,792 B1 | 10/2003 | McCoy et al. |
| 6,920,830 B1 | 7/2005 | Asbach et al. |
| 7,201,440 B2 | 4/2007 | Heck et al. |
| 7,210,735 B2 | 5/2007 | Lang |
| 7,216,929 B2 | 5/2007 | Lang et al. |
| 7,328,941 B2 | 2/2008 | Asbach et al. |
| 7,475,937 B2 | 1/2009 | McGrew et al. |
| 7,673,940 B2 | 3/2010 | Fritz et al. |
| 7,922,244 B2 | 4/2011 | Bearup |
| 8,157,327 B2 | 4/2012 | Tomasi |
| 8,434,827 B2 | 5/2013 | Young et al. |
| 9,144,321 B2 | 9/2015 | Melo |
| 9,560,919 B2 * | 2/2017 | Terhune ................ A47D 1/004 |
| 2003/0218366 A1 | 11/2003 | Rho |
| 2004/0232749 A1 | 11/2004 | Mesalic et al. |
| 2005/0092212 A1 | 5/2005 | Simon et al. |
| 2007/0029848 A1 | 2/2007 | Probst |

* cited by examiner

INFANT CHAIRS

CROSS-REFERENCE TO RELATED APPLICATION

This application is a continuation application claiming priority under 35 U.S.C. § 120 to U.S. patent application Ser. No. 14/800,046, entitled INFANT CHAIRS, filed Jul. 15, 2015, now U.S. Pat. No. 9,560,919 B2, which claims the benefit under 35 U.S.C. § 119(e) of U.S. Provisional Patent Application Ser. No. 62/031,895, entitled HIGH CHAIR, filed Aug. 1, 2014, which are incorporated by reference herein in their respective entireties.

BACKGROUND

The present invention, in at least some forms, relates to infant chairs and, in various embodiments, to high chairs for infants and children.

High chairs may comprise a variety of shapes, sizes, and features. For example, high chairs may provide a safe and comfortable place for infants to sit while eating or drinking. High chairs may include features for securing an infant and/or for preventing and/or limiting the spillage of food and/or drink.

A conventional high chair generally consists of a frame, a seat, and a food tray. The seat is for seating a child and may be moved upwards on the frame. The food tray rests on the seat for holding food and drink. At mealtimes, infants and small children are placed in the high chair to be fed. The child may be strapped into the seat, and then the high chair tray is attached in front of the child. The tray usually has a raised rim or flange around its circumference to form a recessed main tray area, with the rim keeping spilled food and liquid from running off onto the floor.

However, conventional high chairs suffer from various deficiencies that can make such high chairs difficult to use. For instance, conventional high chairs require the user to carefully align the tray with two rails when attaching the tray to the seat. The tray is then pushed in one, and only one, direction for attachment. This can be difficult to do with one hand. In addition, the restraint systems utilized on current high chairs are often times difficult and cumbersome to use. Furthermore, conventional high chairs are typically difficult to clean as food can easily become caught in corners and crevices, and also within the weave of webbing common to high chairs.

Accordingly, a need exists for an improved high chair that cures such deficiencies.

The foregoing discussion is intended only to illustrate various aspects of the related art in the field of the invention at the time, and should not be taken as a disavowal of claim scope.

BRIEF DESCRIPTION OF THE DRAWINGS

Various features of the embodiments described herein, together with the advantages thereof, may be understood in accordance with the following description taken in conjunction with the accompanying drawings.

Figure 1:
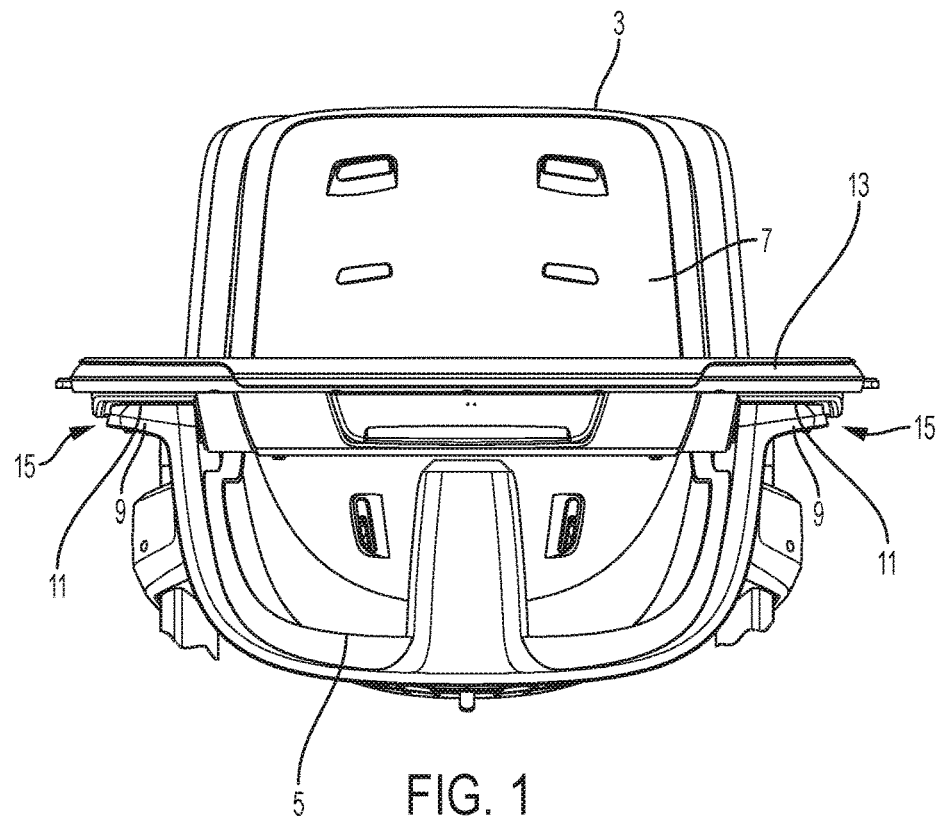
FIG. 1 is a front view of a tray attachment mechanism for use with a high chair embodiment.

The exemplifications set out herein illustrate various embodiments of the invention, in one form, and such exemplifications are not to be construed as limiting the scope of the invention in any manner.

DETAILED DESCRIPTION

The design and/or utility features of the embodiments disclosed in U.S. Pat. No. D730,070, entitled HIGH CHAIR, the entire disclosure of which is hereby incorporated by reference herein may be employed and incorporated in the various embodiments disclosed herein.

In at least some forms, the invention is generally directed to high chairs and seats for feeding infants and toddlers and, more particularly, to improvements for high chairs relating to prevention of spills and overturning dishes on the high chair tray.

According to one embodiment of the present disclosure, a high chair is provided that comprises: a foldable frame; a chair connected to the foldable frame for seating a child, the chair comprising a seat, a backrest and two armrests located on two sides of the seat; and a food tray removably connected to the armrests of the chair. The food tray comprises one of magnetic materials and ferrous-based materials embedded therein and the armrests comprise one of magnetic materials and ferrous-based materials embedded therein such that the food tray is pulled into a mounting position when placed near the armrests due to magnetic attraction.

The portion of the food tray that includes one of the magnetic materials or the ferrous-based materials may have geometry that mates with a geometry of the armrests. At least one of the armrests and the food tray may further comprise mechanical latches to positively lock the food tray to the armrests.

A liner may be positioned over the food tray. In one exemplary embodiment, the liner may be a flexible liner made from a silicone-like material. The flexible liner may be held in place on the food tray by a plurality of suction cups or other means of adhesion such as pressure sensitive adhesives (PSA), hook and loop systems and other common attachment systems. In another exemplary embodiment, the liner may be a rigid liner manufactured from a ferrous material and is held in place by magnets embedded in the food tray. In still other arrangements, the liner could be manufactured from flexible material or it may be fabricated with a rigid portion or portions and with a flexible portion or portions. For example, the center portion of the liner may be rigid and the edges may be formed from a flexible material.

At least one of the chair and the food tray may comprise at least one magnet embedded therein for the attachment of at least one accessory thereto. The at least one accessory may be at least one of a bib, cup, bowl, plate, and serving utensil.

The chair may further comprise a restraint system for securing a child within the chair. The restraint system may comprise: a first web connector; a second web connector configured to be coupled to the first web connector; a first web extending from the backrest of the chair and configured to be slidably passed through an aperture of the first web connector; and a second web extending from the backrest of the chair and configured to be slidably passed through an aperture of the second web connector. Alternatively, the webs may each be two separate members that affix to the web connectors, rather than passing through an aperture. In either case, the first web connector and the second web connector may each include a magnet configured to align and secure the web connectors. The magnets of the first web connector and the second web connector may be configured to be secured to a portion of the chair when the first web connector and the second web connector are not in use. The restraint system may further comprise a buckle assembly extending from the seat of the chair and configured to receive the first and second web connectors therein. The buckle assembly may be biased towards the seat by an elastic material when not in use.

At least some of the high chair of the present disclosure may be significantly easier to clean than conventional high chairs due to the use of flexible liners, rigid liners or both and incorporating a restraint system manufactured from coated webbing or molded straps as will be discussed in greater detail hereinafter.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes," or "contains" one or more elements possesses those one or more elements, but is not limited to possessing only those one or more elements. Likewise, an element of a system, device, or apparatus that "comprises," "has," "includes," or "contains" one or more elements, but is not limited to possessing only those one or more elements. Likewise, an element of a system that "comprises," "has," "includes," or "contains" one or more features possesses those one or more features, but is not limited to possessing only those one or more features.

For convenience and clarity, spatial terms such as "vertical," "horizontal," "up," and "down," for example, may be used herein with respect to the drawings. However, various devices disclosed herein can be used in different orientations and positions, and these spatial terms are not intended to be limiting and/or absolute.

A high chair in accordance with the present disclosure includes a foldable frame 1 (see FIG. 10) and a chair 3 for seating a child. With reference to FIG. 1, the chair 3 includes a seat 5, a backrest 7, and two armrests 9. The two armrests 9 are located on two sides of the seat 5. A food tray 13 is removably attached to the armrests 9 and includes a pair of members on a bottom portion thereof that have a geometry that corresponds to the receiving opening 11 of the armrests 9. In the embodiment depicted in FIG. 1, the receiving openings 11 are located on the food tray 13 and not in the armrests 9. In another embodiment, depicted in FIG. 15, each armrest 9 has an outer side with a receiving opening 11 formed therein.

With reference to FIG. 1, the food tray 13 of the high chair is configured as a magnetically coupled tray that directs the tray from a short distance to pull into its mounting position relative to the armrests 9 of the high chair by providing magnetic materials or ferrous-based materials that are embedded in or attached to at least one of the armrests 9 and the tray 13. More specifically, the user can place the tray 13 roughly in the right area near the armrest 9 and the members on the bottom portion of the tray 13 are guided via the receiving openings 11 of the tray 13 (or in the armrests 9), which form "large" geometric funnels, to initially orient the tray 13 and begin guiding it into place. Next, magnets (not shown) embedded in at least one of the tray 13 and the receiving opening 11 of the tray, begin pulling the tray into alignment and into its final position as shown by position 15 in FIG. 1. While the magnets are pulling the tray 13 into position, the magnetic force can also be used to compress mechanical latches (not shown) provided on the tray 13. To do this, the latches travel along a ramp provided in the receiving opening 11, and as the magnet pulls them along the ramp, the ramp applies a load in the direction of latch travel for compression. Then, in the final position, the latches may finally engage with the armrest 9 of the high chair. Such mechanical latches may be necessary to hold the tray with adequate strength.

Figure 18:
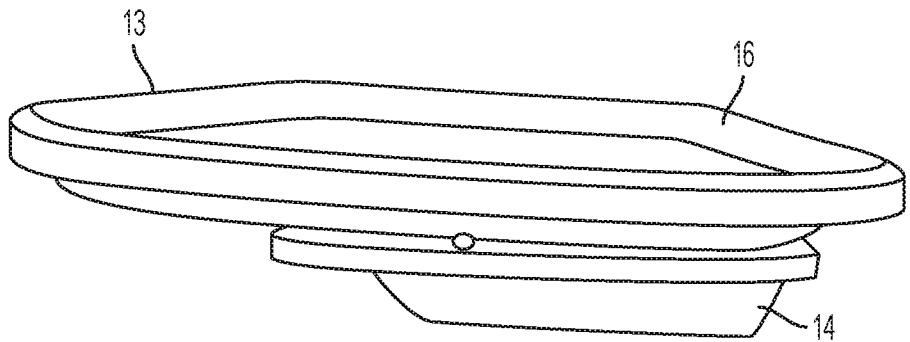
FIGS. 18 and 19 are side elevation views of a split tray for use with the high chair.
Figure 19:
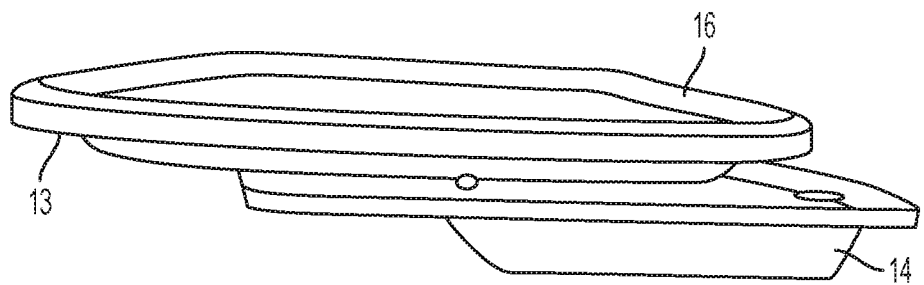

With reference to FIGS. 18 and 19, another function of the tray 13 is to slide toward and away from the child in the seat 5. For example, at least some reasons for this function may be to keep the food close to the child, for child comfort, or to allow for easier insertion and removal of the child from the high chair. While most high chairs have a tray that slides along a channel formed at the interface between the tray and seat, at least some of the high chair embodiments of the present disclosure may use a split tray design where a bottom half 14 of the tray 13 remains fully fixed to the arm rests 9 of the chair 3, while a top half 16 is allowed to slide relative to the bottom half 14. Considering the alignment and mounting methods described hereinabove, this split tray design may be important to achieve effective tray adjustment. The tray halves 14, 16 slide relative to one another, and they may also lock into one of the at least two positions for the reasons described hereinabove.

Figure 20:
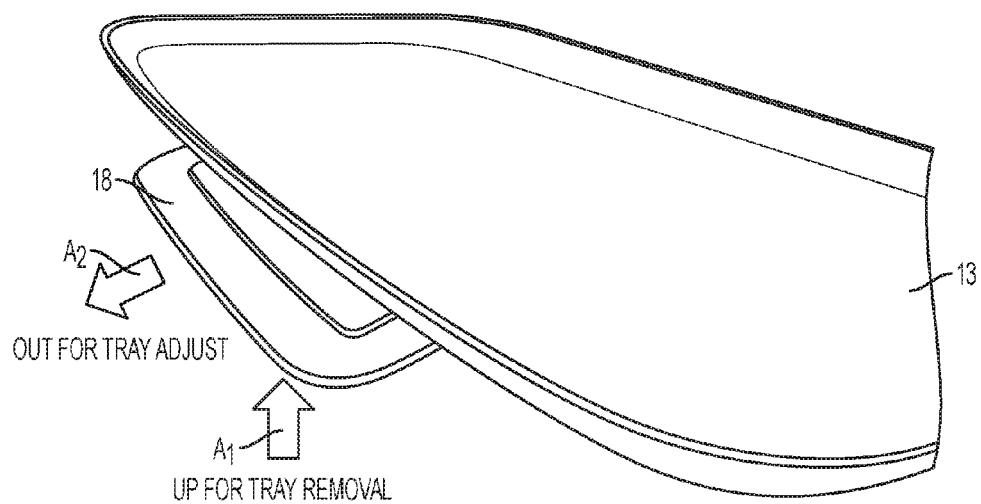
FIG. 20 is a perspective view of a dual function handle for use with a tray of the high chair.

For removal of the tray 13 from the chair 3 of the high chair, a user must interact with the tray 13 to disengage the latches. In addition, a separate mechanism within the tray 13 allows for the tray 13 to slide toward and away from the child in the seat, and to lock into one of at least two sliding positions. The tray removal function and the tray slide function may be achieved through use of separate buttons or levers. Alternatively, with reference to FIG. 20, the tray 13 may include a dual-function handle 18 that allows for two unique motions from the same handle to serve these two different functions. For example, an upward motion of the handle 18 as shown by arrow $A_1$ may disengage the latches for removal of the tray, while a pulling motion of the handle 18 as shown by arrow $A_2$ may allow the tray 13 to slide forward and back. While an exemplary dual-function handle 18 has been described hereinabove, this is not intended to limit any of the embodiments of the present disclosure as any suitable handle requiring any number of unique motions engaging any number of functions may be utilized.

Conventional high chairs may also include a rigid plastic tray liner that covers the tray. This tray liner may, for example, be removable for cleaning, often in a dishwasher. During a given day, a child may get the tray liner dirty three or more times. A parent must clean the tray liner after each meal, or else the main tray becomes very messy. This is not ideal because the main tray is typically not dishwasher safe and can be harder to clean.

Figure 2:
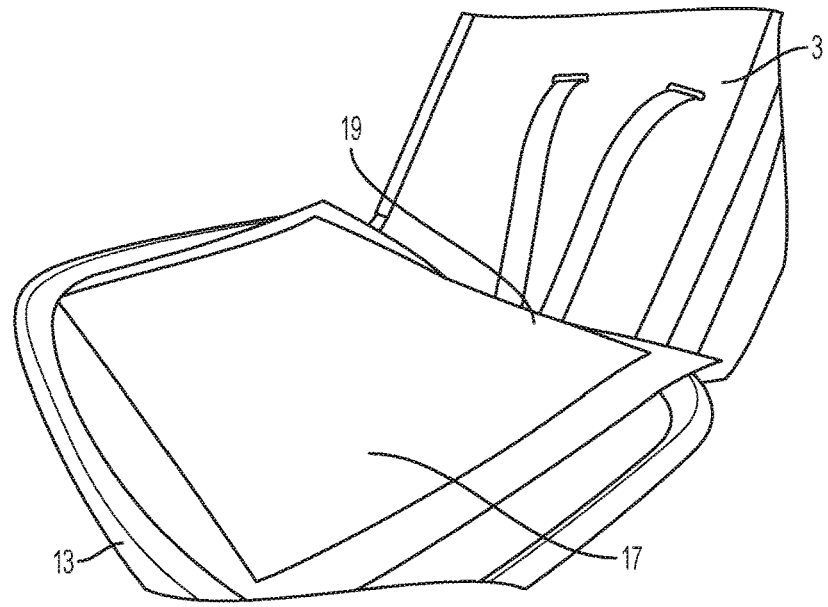
FIGS. 2 and 3 are perspective views of a flexible liner for use with the high chair and a table surface.
Figure 3:
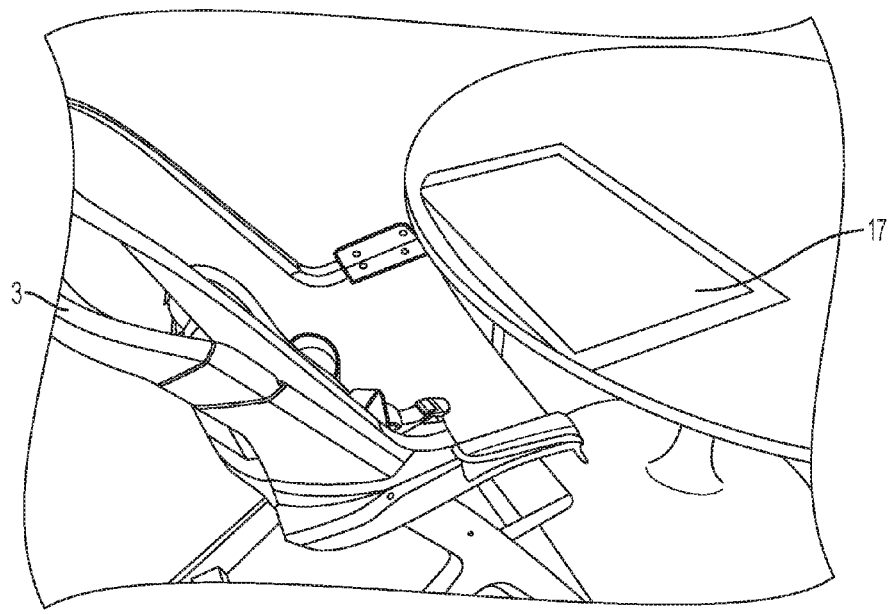

With reference to FIGS. 2 and 3, an embodiment of the high chair of the present disclosure may employ flexible tray liners 17. Like a rigid plastic tray liner, a flexible tray liner 17 can be used to provide a cleanable surface for food and keep the tray underneath clean. However, unlike the conventional tray liner, a user could have three or more flexible tray liners 17 for use throughout the day. A flexible tray liner 17 would be easy to remove and to clean at the sink or in the dishwasher. A self-healing surface may be used to facilitate cutting of food on the liner. In addition, a section 19 of the tray liner 17 may be configured to wrap around the side of the tray 13 closest to the child to help keep the tray 13 clean. The liner 17 may also be provided with a raised edge or lip around an outer edge thereof or a trough around the outer edge to help keep liquid and mess contained. The flexible liner 17 may be made from any suitable material such as, but not limited to, flexible silicone.

Figure 4:
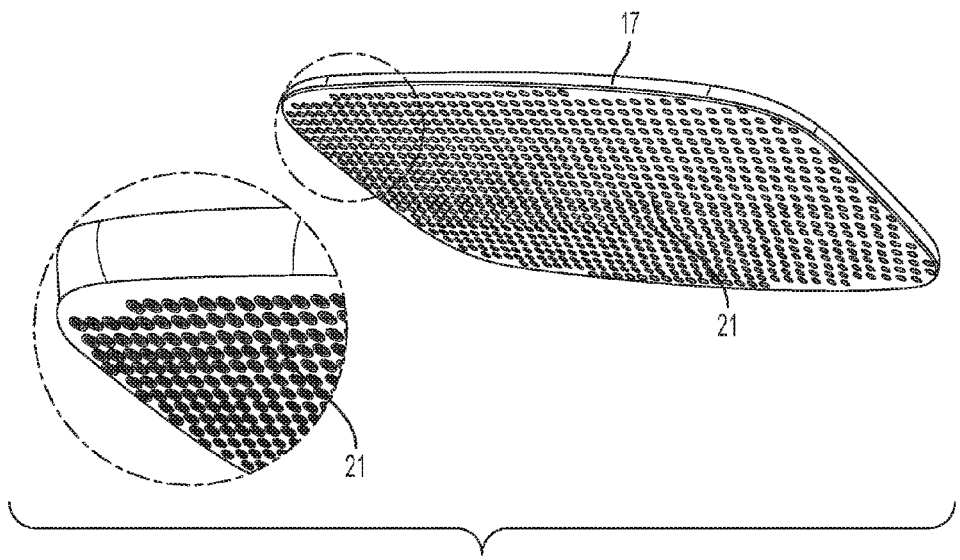
FIG. 4 is a perspective view of an exemplary system for attaching a liner to the food tray of a high chair.

Rather than clipping to the tray 13 like conventional rigid plastic tray liners, the flexible tray liner 17 may be fit into a form-fitting recess in the tray 13, held in place using embedded magnets, or by using magnetically-responsive materials such as ferrous materials to hold to magnets embedded in the tray 13. Alternatively, use of miniature suction cups 21 (see FIG. 4), satae (like on gecko feet), or special low-adhesion reusable adhesives would provide a bond to the surface underneath.

With specific reference to FIG. 3, the flexible liner 17 works not only on the tray 13 but also on traditional dining surfaces. This is helpful with the tray is not being used so the child can eat on an easily cleanable surface that also helps to contain mess. This is an improvement over the traditional dining surface. And again, there can be multiple flexible tray liners 17 (or in this scenario, placemats) for use throughout the day. The systems for attaching the liner 17 to the tray 13 described hereinabove, can also hold the liner 17 to the traditional dining surface, thereby preventing it from slipping or being pulled off by a child. Additionally, such a liner may include a raised edge or lip around the perimeter thereof for containment of liquid and mess.

Figure 5:
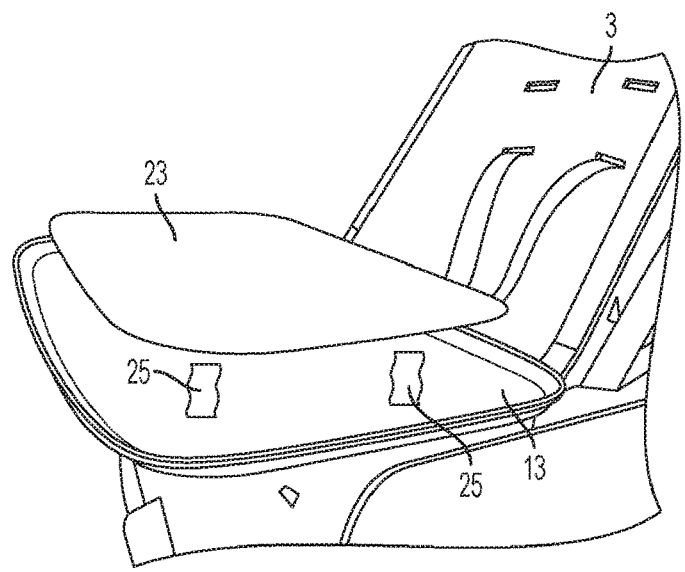
FIG. 5 is a perspective view illustrating a rigid liner for use with the high chair.

With reference to FIG. 5, another alternative to the common plastic tray liners is a rigid tray liner 23 that utilizes magnetically-responsive materials such as ferrous materials. This tray liner could be held to the tray 13 using embedded magnets as shown by element 25, thereby improving user experience and potentially providing easier attachment and removal than traditional tray liners. Such a liner also provides a base to which a system of magnet accessories could attach as discussed in greater detail hereinafter. Magnetic attachment is not intended to limit the present disclosure, since more conventional means of plastic tray liner attachment could also be applied to the rigid tray liner.

Like the flexible tray liner 17 discussed hereinabove, it would provide a cleanable surface for food and would keep the tray underneath clean, and could be dishwasher-safe. A section of the rigid tray liner 23 may wrap around the side of the tray closest to the child to help keep the tray clean. A raised lip or recessed trough around the outer edge may also be provided to keep liquid contained. The rigid tray liner 23 may be covered or coated with any suitable material such as, but not limited to, anti-microbial and hydrophobic plastics or powder coating.

Other systems for magnetic accessory attachment to a tray include use of magnets or magnetically-responsive materials on the tray surface or embedded within the tray itself.

Figure 6:
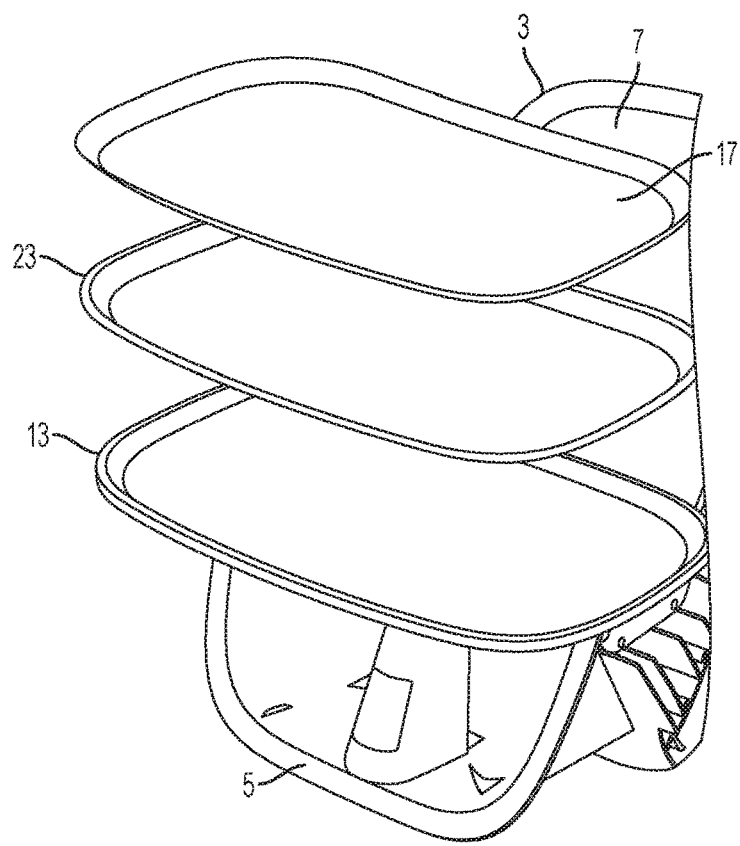
FIG. 6 is a perspective exploded view of a chair of the high chair with an exemplary liner arrangement.

With reference to FIG. 6, the flexible tray liner 17 and the rigid tray liner 23 may be used in combination with the rigid tray liner 23 being magnetically secured to the tray 13 and the flexible tray liner 17 being positioned on the rigid tray liner 23 to keep the tray 13 and the rigid tray liner 23 clean. A potential cause of mess while a child is eating can be the spilling, ejection, or tipping of cups, bowls, plates, or other serving devices. For this reason, manufacturers of child serving devices frequently make the bottom surface with a high coefficient of friction to prevent sliding, make the bottom heavy to the table to avoid tipping, or even use a large suction cup on the base to bond the serving device to the tray.

Figure 7:
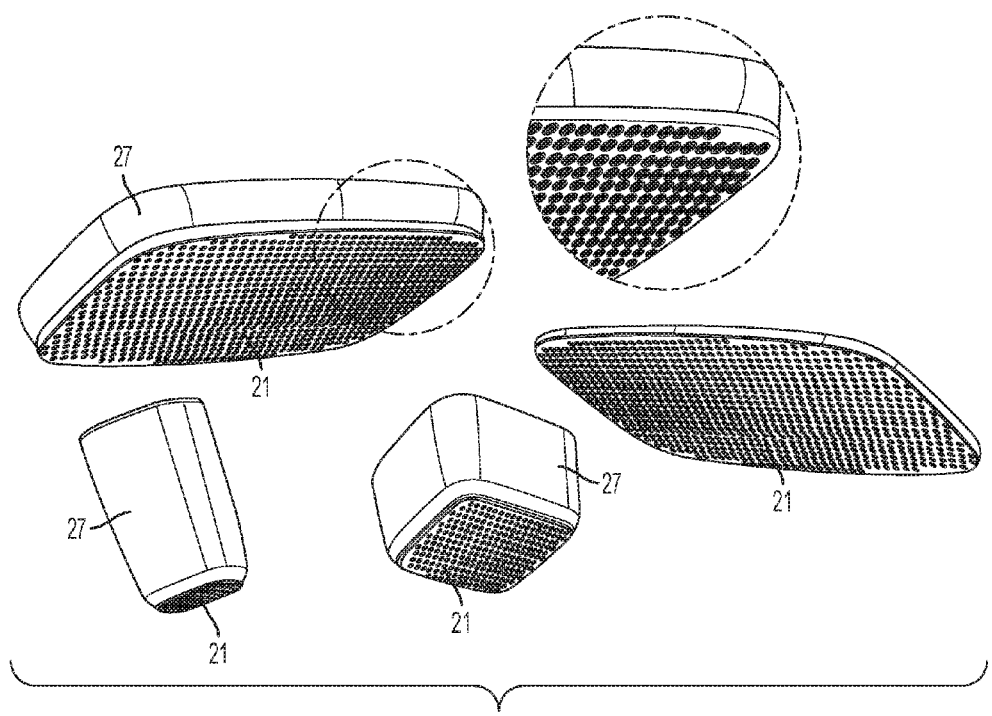
FIG. 7 is a perspective view of a first exemplary embodiment of utensils for use with the high chair.

With reference to FIG. 7, the present disclosure is also directed to a unique bonding of the serving device 27 to the tray 13. In one exemplary embodiment, magnets may be used on the bottom of the serving device 27 to allow it to hold with a desired amount of force to the tray 13. Alternatively, use of miniature suction cups 21, satae (like on gecko feet), or special low-adhesion reusable adhesives could provide a bond to the surface underneath. Such systems are easier for parents to use, as there is no need to compress a large suction cup or to find the release mechanism of the suction cup's suction, as is the case with a number of conventional products. Magnetic materials or magnetically-responsive materials such as ferrous materials and help prevent spills, ejection, or tipping of such devices.

Figure 8:
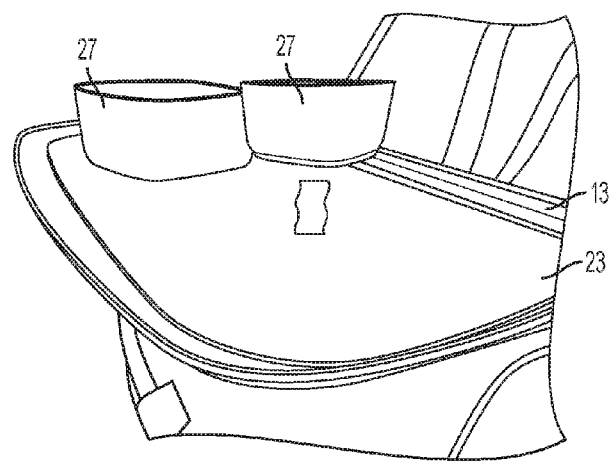
FIG. 8 is a perspective view of a second exemplary embodiment of utensils for use with the high chair.
Figure 21:
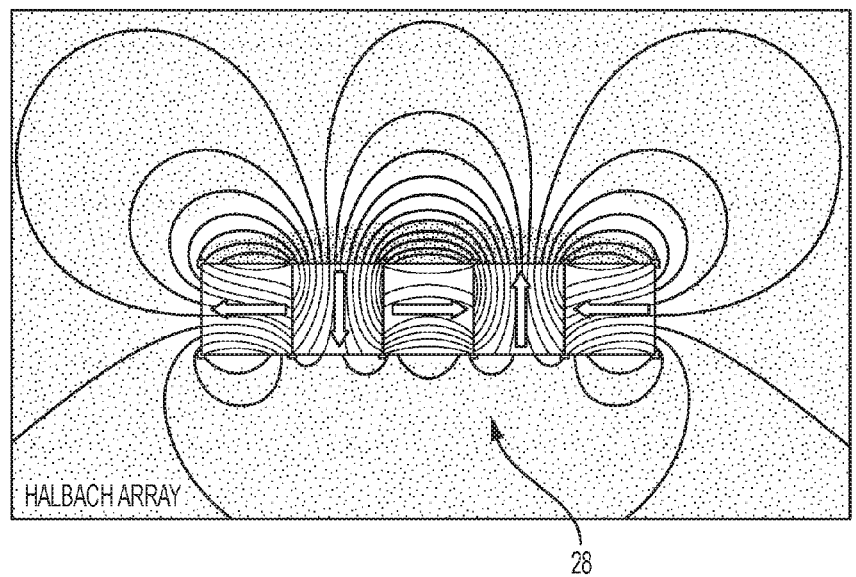
FIG. 21 is a schematic illustration of a multiple pole magnetic array that may be utilized with serving devices.
Figure 22:
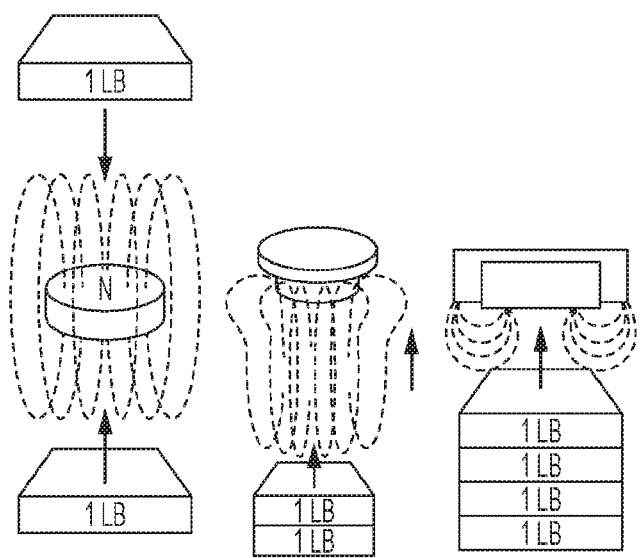
FIG. 22 is a schematic illustration of a ferrous disk or cup that may be utilized with serving devices.

With reference to FIG. 8, to integrate the magnet into the serving devices 27, a conventional magnet can be molded or otherwise bonded into the base of the device 27 during manufacture. Alternatively, an injection molded magnet may be employed. Injection molded magnets, also known as polymer bonded magnets, may be molded separately and assembled onto the device 27, or molded directly with the rest of the device 27 to provide a permanent, integral bond. Alternatively, there may be a removable "coaster" that interfaces between the device 27 and the tray 13 and uses any of these approaches to integrate a magnet into the base. This allows the serving device 27 to be used with or without the magnetic base, which could help improve the ability of the serving device to withstand microwaving. In any case, the magnet may have a single pole, or the magnet could be magnetized with a multitude of poles to allow for magnetism over a larger area. With reference to FIG. 21, a multitude of poles could also increase magnetic strength, similar to Halbach arrays, denoted generally as reference numeral 28, found in common refrigerator magnets. Alternatively, or in conjunction with, a ferrous disk or cup on the reverse of the magnet can be used to redirect magnetism and to increase magnetic strength as shown in FIG. 22. In addition, such devices 27 may be configured to be secured to the rigid tray liner 23 discussed hereinabove.

Figure 9:
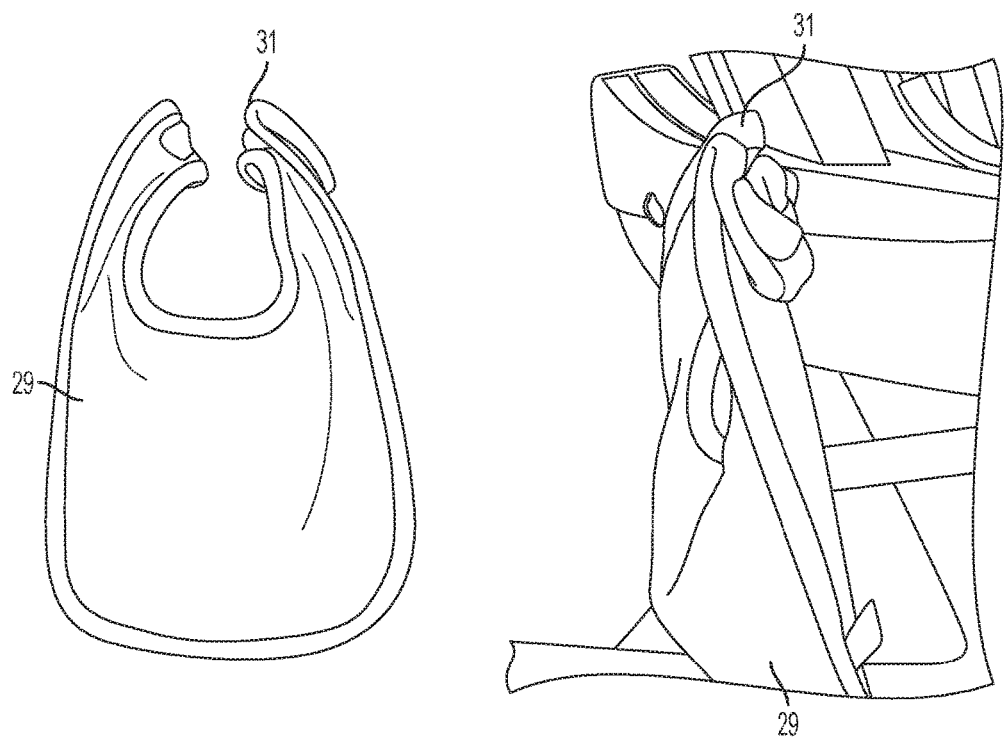
FIG. 9 is a front view and a side view illustrating an exemplary accessory and the manner in which the accessory is utilized with the high chair.

With reference to FIG. 9, other accessories such as a bib 29 or utensils may also attach to the seat or tray through use of magnets. In the case of bib 29, the magnets 31 could also be used to secure the bib 29 around a child's neck, thereby replacing other fastening mechanisms.

In addition, there are times when users do not need the tray 13, especially as children get older and eat from the table. When the tray 13 is not in use, it is beneficial to the user to have somewhere convenient to store it. The high chair of the present disclosure provides a location where the tray 13 may attach and be secure. The attachment may be a mechanical attachment or utilize magnets alone or in conjunction with the mechanical attachment to secure the tray 13 in place.

If the user has eating accessories (bibs, utensils, eating containers, wipes, flexible tray liners, etc.), various embodiments of the high chair of the present disclosure may also provide a storage area on the seat for these items as well. For instance, a storage basket underneath the seat or a storage pouch on the back of the seat may be provided. Either storage solution may be attached using a variety of systems, such as, but not limited to, webbing or strap loops, snaps, hook and loop fasteners, zippers, buckles, or magnets.

Figure 10:
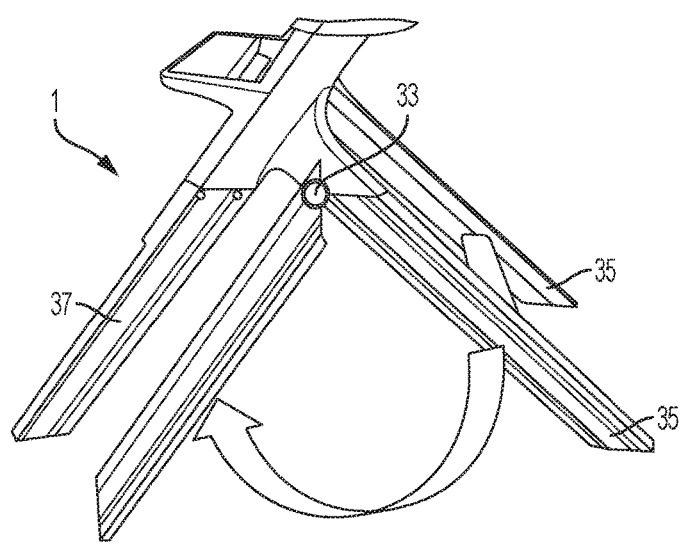
FIG. 10 is a side elevation view of a lower portion of a foldable frame of the high chair.

With reference to FIG. 10, a rear-leg hinge 33 may be incorporated for easy out of box assembly and customer collapsibility. This reduces size for packaging and shipping. An integrated hinge and easy to use latch create this motion while maintaining safety. Shielding of the rotating joint can be used to prevent pinch hazards. Bumpers may be used to prevent damage or injury where the rear legs 35 fold and come into contact with the front leg assembly 37.

Tubes of aluminum, or other metallic materials, may be used on the high chair as a strong, light-weight structural material. They may be used for both the legs 35, 37 and the horizontal supports. For aesthetic appearance, it is desirable to hide all fasteners. To this end, a number of mechanical features or combinations thereof can be utilized to make the fasteners hidden from the user.

To ensure a solid connection between the aluminum legs and the plastic connector pieces, an interference-fit using tall thin collapsing ribs, wide short crush ribs, or features in-between or a combination thereof may be utilized. A secondary feature can ensure the tubes cannot be removed, such as a threaded fastener, rivet, or a barbed nail. A fastener need not be used if there is a more subtle feature like a punch, dimple, or bent tab in the aluminum leg at the joint. In addition, the plastic parts could include a molded-in snap feature that engages inside the aluminum tube and cannot easily be removed.

Figure 23:
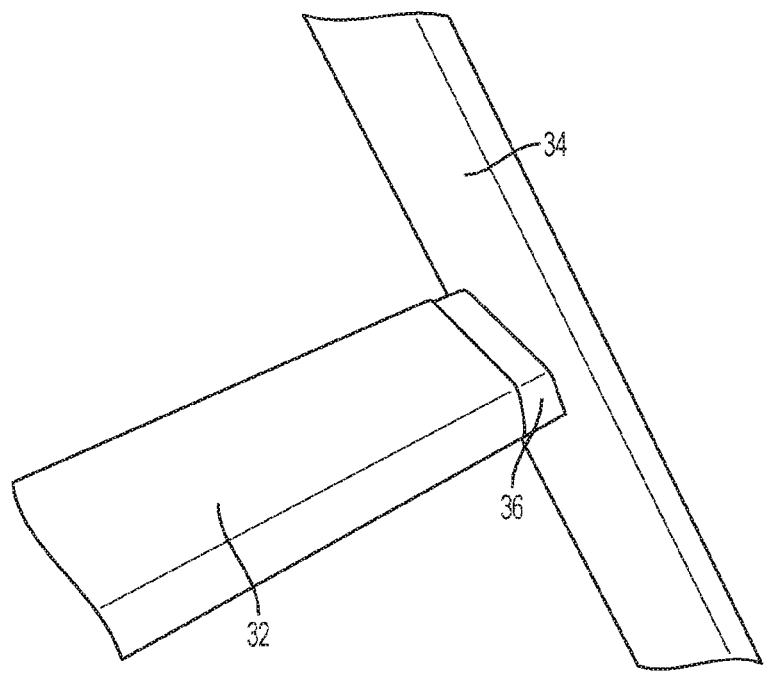
FIG. 23 is a perspective view of a portion of the high chair in accordance with the invention illustrating a transition piece configured to create a joint that is hidden from view.

Furthermore, with reference to FIG. 23, to ensure a solid connection between the aluminum horizontal supports 32 and the aluminum legs 34, a transition piece 36 may be provided that utilizes a combination of the methods described above to create a joint that is hidden from view. For example, blind rivets may be used to hold the transition piece 36 to the aluminum leg 34, while an interference-fit may be used to attach to the horizontal supports 32.

Figure 11:
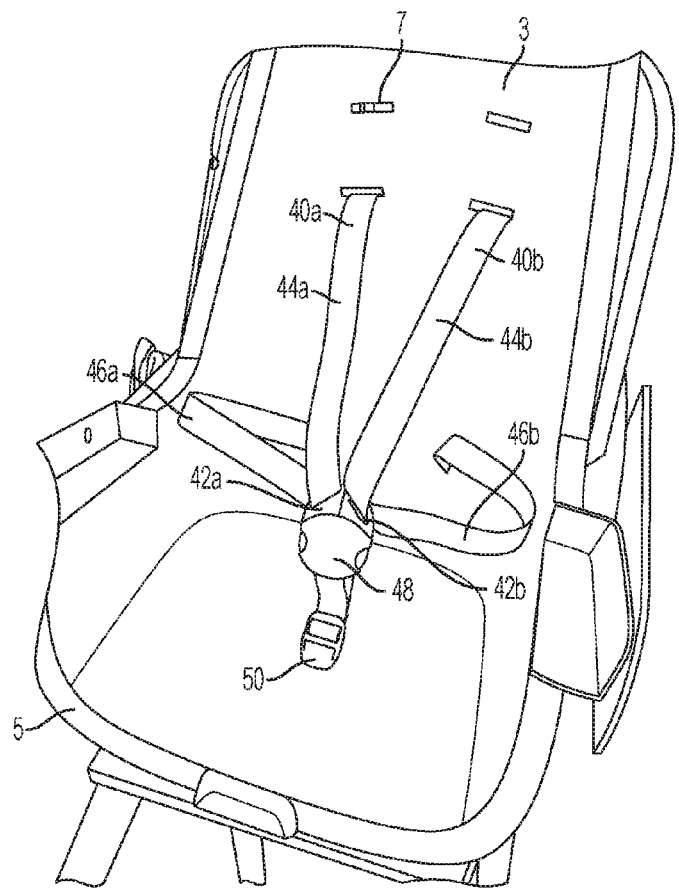
FIG. 11 is a perspective view of a first exemplary embodiment of a harness mechanism for use with the high chair.
Figure 12:
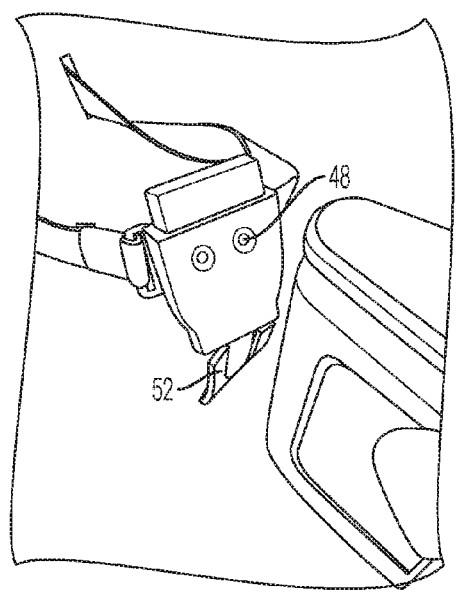
FIG. 12 is a rear perspective view of an exemplary crotch strap for use with the harness mechanism of FIG. 11.

With reference to FIG. 11, an "active" restraint system for use with the high chair may include a first web 40a and a second web 40b that extend from the backrest 7 of the high chair 3 as shown. The webs 40a, 40b can include various types of woven fabric materials and/or other suitable belt or strap materials known in the art that provide sufficient strength, flexibility, durability and/or other characteristics. Desirably, each of the webs 40a, 40b is made from a coated webbing material or is configured as a molded strap. A primary advantage of these materials may be that they are much easier to clean than webbing alone. Besides the cleanability, both coated webbing and molded straps may hold their shape more than traditional webbing. In use, traditional webbing tends to lie flat against the seat back, while these materials may stand-off of the seat surface to help present the webs to the parent, making them easier to use than traditional webbing.

Each of the webs 40a, 40b slidably pass through an aperture in a corresponding web connector 42 (identified individually as a first web connector 42a and a second web connector 42b). Passing the webs 40a, 40b through the web connectors 42a, 42b, respectively divides each of the webs 40a, 40b into a corresponding shoulder web portion 44 (identified individually as a first shoulder web portion 44a and a second shoulder web portion 44b), and a corresponding lap web portion 46 (identified individually as a first lap web portion 46a and a second lap web portion 46b). The end portions of the webs 40a, 40b can be secured or otherwise affixed to the chair 3 and/or other adjacent structures using various methods known in the art.

Figure 15:
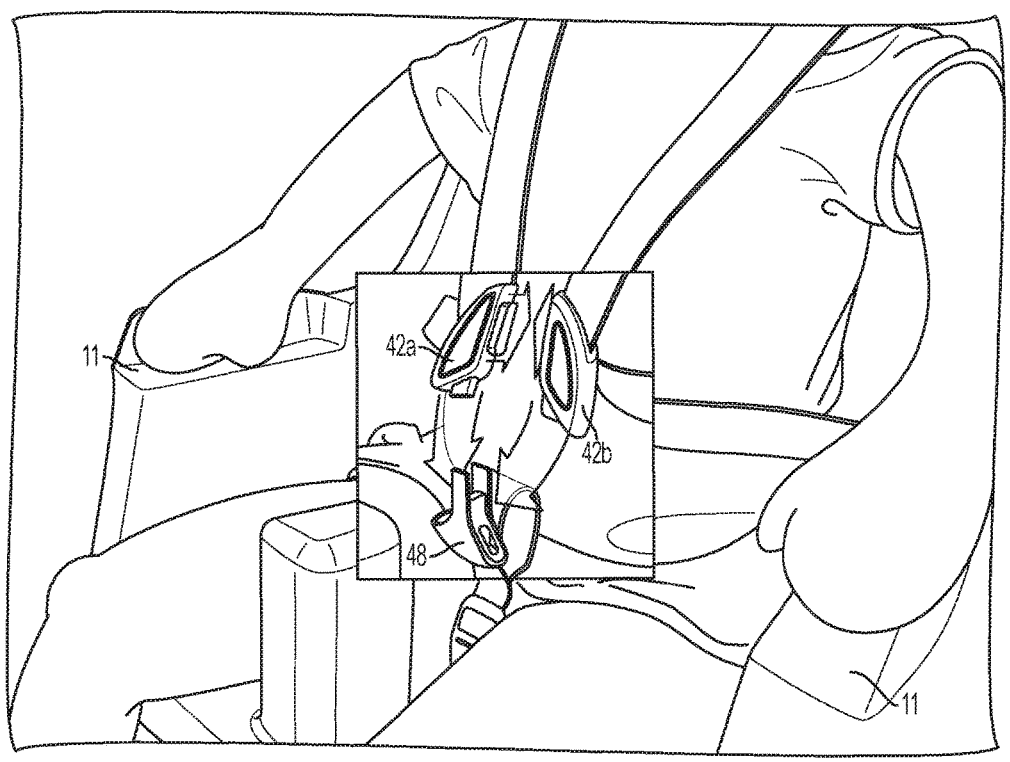
FIG. 15 is a perspective view of a second exemplary embodiment of a harness mechanism for use with the high chair.
Figure 16:
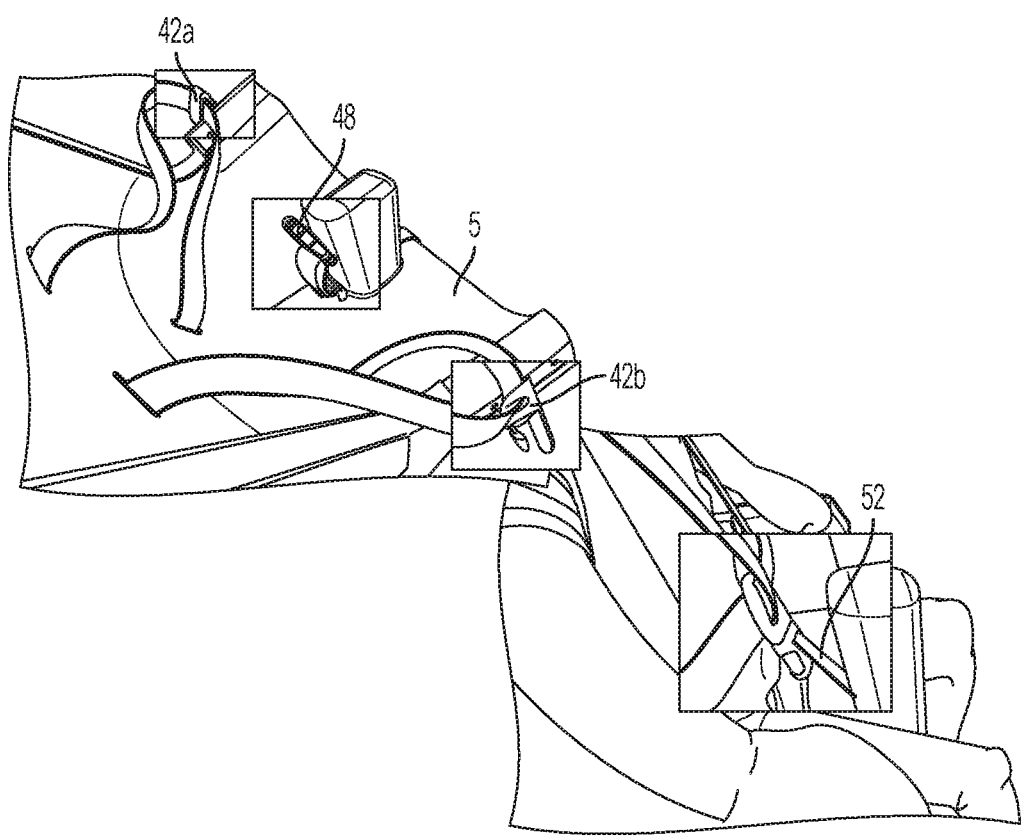
FIG. 16 is an illustration of a third exemplary embodiment of a harness mechanism for use with the high chair.

With reference to FIGS. 15 and 16, the web connectors 42a, 42b can be releasably coupled to a buckle assembly 48 using various methods known in the art. The buckle assembly 48, for example, may require that the web connectors 42a, 42b interlock and simultaneously engage the buckle assembly 48. The buckle assembly 48 is attached to a distal end of a crotch web 50 that extends from the seat 5 of the high chair. The web connectors 42a, 42b may use magnets (not shown) to aid in alignment and securing of the web connectors 42a, 42b. Once in close proximity, the magnets may pull the web connectors 42a, 42b into place and may also engage a mechanical latch (see FIG. 15). In an alternative embodiment, the web connectors 42a, 42b may pull into the buckle assembly 48 directly through use of magnets.

Figure 24:
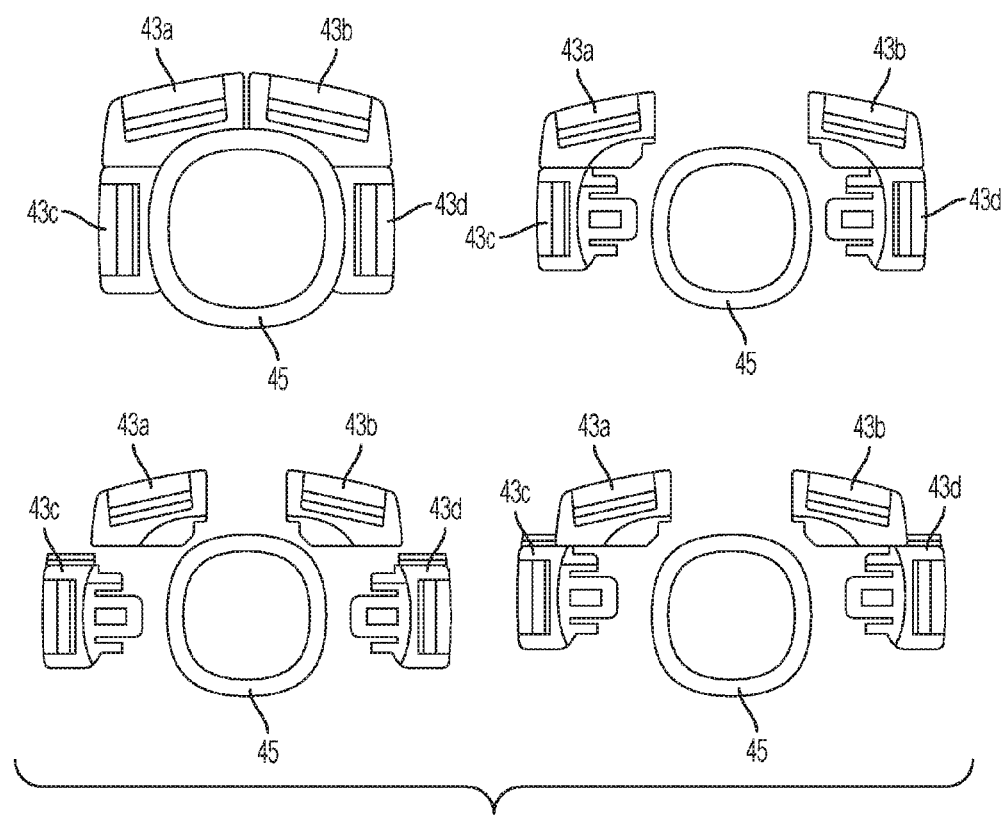
FIG. 24 is a front elevation view of a fifth exemplary embodiment of a harness mechanism for use with the high chair.

With reference to FIG. 24, an alternative to webs 40 passing through an aperture in a corresponding web connector 42, the first shoulder web portion 44a and second shoulder web portion 44b may be separate from first lap web portion 46a and second lap web portion 46b. The shoulder web portions 44a, 44b may be attached using a separate web connector that is provided as four distinct parts 43a, 43b, 43c, and 43d. The parts 43a, 43b, 43c, and 43d are linked together and connected to a central connection member 45, thereby not requiring any extra effort by the user during assembly. Alternatively, the shoulder web portions may be removed and the "active" restraint system has been changed from a 5-point harness to a 3-point harness.

Using traditional high chair restraint systems, the harness (webbing and buckles) may be trapped underneath the child after they are placed in the seat. This is increasingly difficult if this is a 5-point harness rather than 3-point harness design. A first innovation is use of a magnetic clasp to attach the restraint buckles to the side of the high chair so they are not underneath the child as described (see FIG. 16). This would prevent the child from sitting on the harness while still being easy to buckle after the child is placed in the seat. In the case of the crotch restraint, magnets may be used to attach the webbing to the crotch post. Alternatively, or in addition, a semi-rigid material 52 may be used in place of the crotch web 50 to bias it out of the way when the child is being placed in the seat (see FIGS. 11 and 16).

Figure 13:
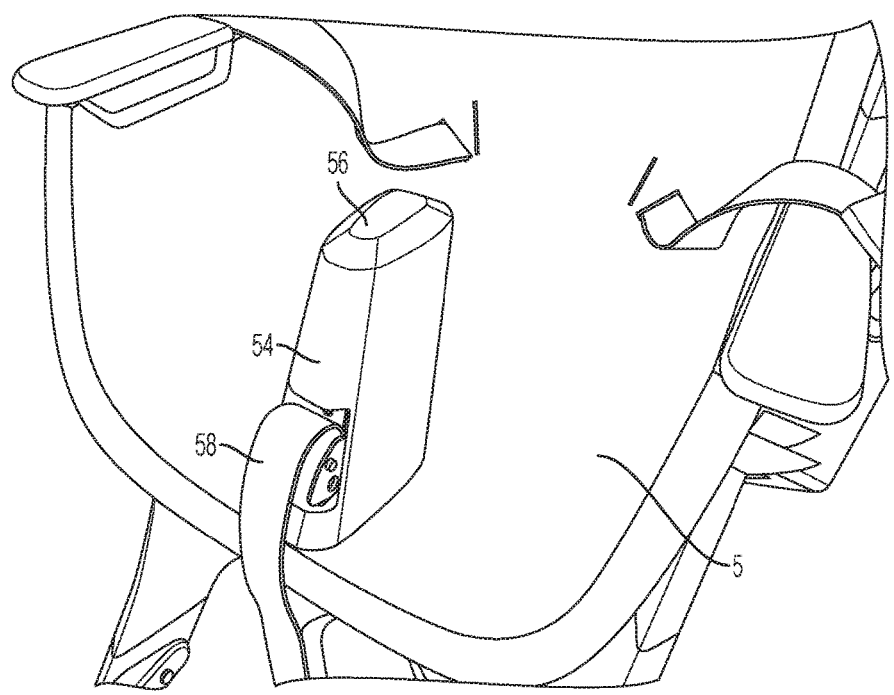
FIGS. 13 and 14 are perspective views of mechanisms used for tightening the harness mechanism of FIG. 11 around a seated child.
Figure 14:
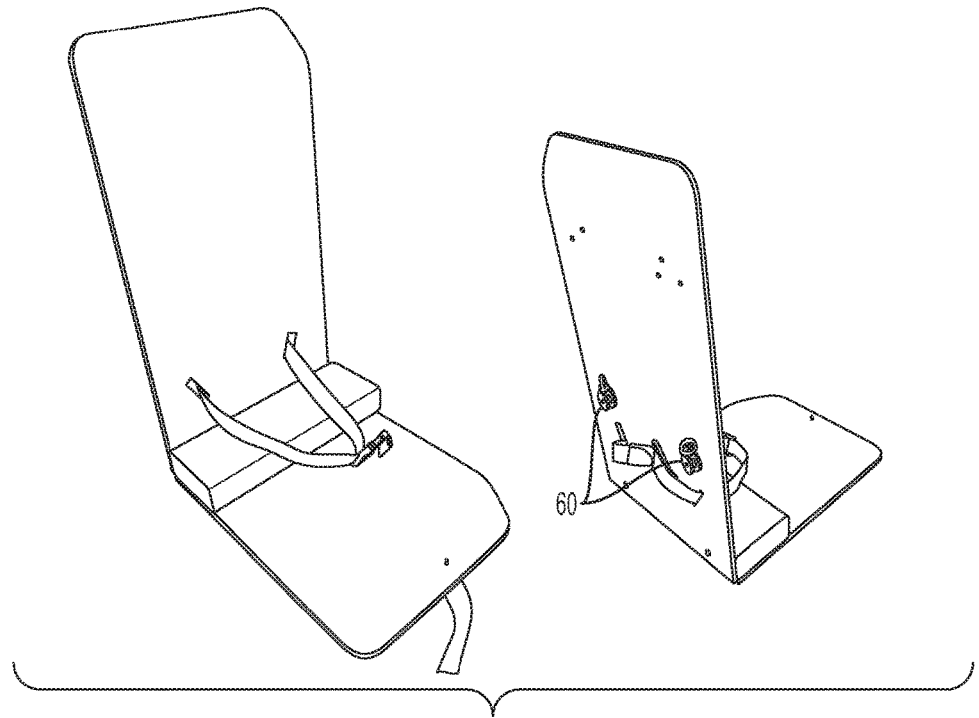

With reference to FIG. 13, once the child is in the seat and buckled, it is desirable for the harness system to be snug in order to hold the child securely. While traditional high chairs require tightening of each web 40a, 40b, at least some of the high chair embodiments of the present disclosure include a cinching mechanism 54 that may be similar to those used in car seats. For example, the cinching mechanism 54 may be mounted under the seat, in front of the crotch post 56, or integrated within the crotch post 56 (see FIG. 13). Pulling on a single strap 58 located at the base of the seat tightens the child within the entire 5-point harness. An alternative approach would use a similar pull on a single strap, but the pull tightens the straps around the child's waist instead of the straps over the shoulders. This design may, for example, require redirection of the single pull via pulleys 60 or another means of redirection (see FIG. 14). The shoulder straps may be included or excluded with this approach, thereby allowing it to function as either a 5-point or a 3-point harness.

Figure 17:
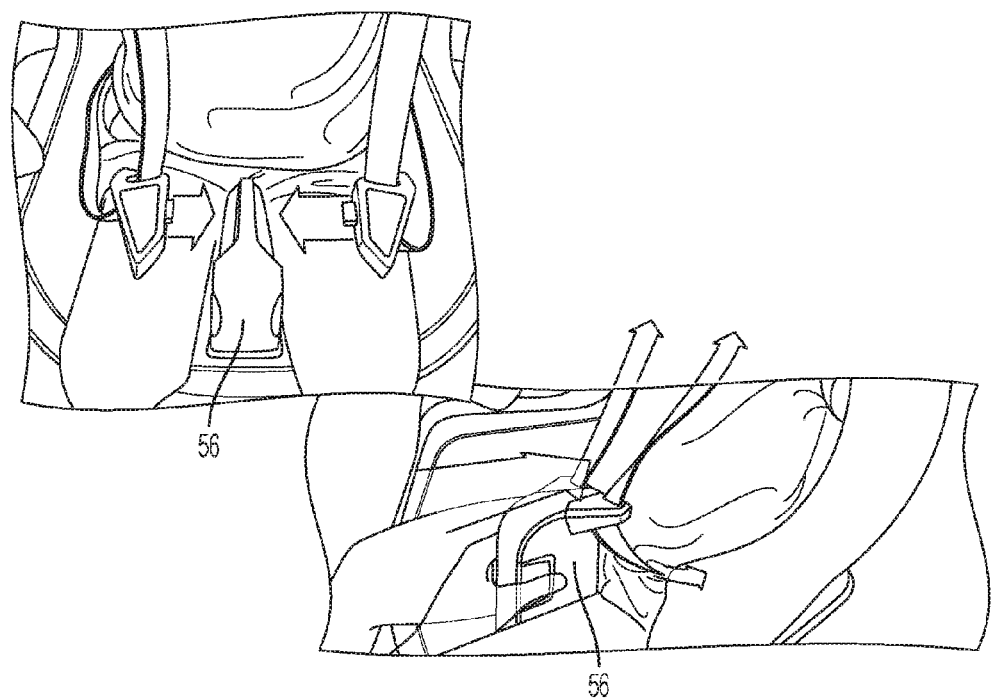
FIG. 17 is a front view and perspective view of a fourth exemplary embodiment of a harness mechanism for use with the high chair.

A passive restraint system may include the seat shape, the crotch post 56, and the tray 13 which are components of the overall restraint system. Together, they may, for example, keep a child captive even when the harness of the active restraint system is not in use. The adjustable tray allows the tray to be closer to the child or farther away from the child. The crotch post 56 may also keep the child from sliding underneath the tray and may keep their legs in place so they cannot crawl out from above the seat when the tray is in place. In various embodiments of the present disclosure, use of an adjustable crotch post 56 may keep the child even more securely retained in the seat. Sliding the crotch post 56 toward the child could help to secure them in place, further preventing them from moving in a manner that might allow them out of the seat (see FIG. 17).

Along with the adjustable crotch post 56, the harness could buckle directly into the crotch post 56, which might eliminate the need for a crotch restraint and floating buckle. This could make the seat more cleanable with no crotch restraint and easier to use with no "floating" buckle (see FIG. 17). In addition, the single webbing section that is used to tighten the harness (either via shoulder tightening or waist tightening) could be attached to the adjustable crotch post 56 such that sliding the crotch post results in tightening of the harness equivalent to that distance of the webbing being pulled by hand. In doing so, a loose harness initially becomes tight when the crotch post is moved toward the child.

Antimicrobial surfaces may be provided to various elements of the high chair described herein to keep a child safe in an eating environment where bacteria are likely to thrive. This may be done using an antimicrobial coating or embedded within the material of parts coming into contact with a child or parent. Applicable places for antimicrobial technology may include, but not be limited to: flexible tray liner; rigid tray liner; tray; accessories; seat; restraint coated/molded webbing; restraint buckles; release handles; buttons; and other interaction points.

Referring now to FIGS. 25-29, another "infant-supporting" chair embodiment 100 is depicted. As used herein, the term "infant-supporting" is intended to encompass infants as well as small children that are commonly fed utilizing "high chairs" and high-chair like arrangements. Moreover, as the present Detailed Description proceeds, the person of ordinary skill in the art will readily appreciate that certain features of the chairs and chair assembly embodiments disclosed herein may find equal utility in use in connection with chair and chair arrangements that may be more specifically tailored to support larger children or adults without departing from the spirit and scope of the present invention. In the illustrated arrangement, the infant-supporting chair 100 includes a frame assembly 110 that is configured to movably support a seat 200 in a plurality of heights above the floor or other surface upon which the frame assembly 110 is supported. As will be discussed in further detail below, the chair assembly 100 also includes a tray assembly 400 that is removably attachable or "releasably mountable" to the seat 200.

Still referring to FIGS. 25-29, the frame assembly 110 is fabricated from multiple components that may be fabricated from various structural materials. For example, the components of the frame assembly 110 may be fabricated from extruded aluminum or from steel or other metal material as well as from structural blow-molded plastics and other polymer materials and combinations thereof. The metal components may be painted or otherwise coated or encapsulated in anti-microbial and hydrophobic plastics or be coated or covered with powder coating or other suitable coating materials to achieve a desired aesthetic appearance for example.

The frame assembly components may be joined together by, for example, screws, bolts, spring-biased detents, rivets, bent tabs, molded snap features, interference fits, crushable features, hinges, tongue-in-groove arrangements, etc. In some embodiments, the fasteners may be removable to facilitate disassembly by the user for storage and/or transport purposes and, in other embodiments, the fasteners or fastener medium may not be removable. For example, in other embodiments, the frame assembly components may be joined together by welding, adhesive, etc. In still other embodiments, the frame assembly may be formed in one piece. For example, the frame assembly may be formed from structural, blow molded plastic or other suitable materials.

In the embodiment illustrated in FIGS. 25-29, the frame assembly 110 includes a right or "first" side structure 120 and a left or "second" side structure 150. The right side structure 120 includes a "first" or right vertical strut 122 that is attached to a "first" or right transition joint 124. A "first" or right front leg 126 and a "first" or right rear leg 128 are attached to the right transition joint 124. Similarly, the left side structure 150 includes a "second" or left vertical strut 152 that is attached to a "second" or left transition joint 154.

A "second" or left front leg 156 and a "second" or left rear leg 158 are attached to the left transition joint 154 as shown. A pair of front cross struts 180, 182 are attached to the right front leg 126 and the left front leg 156 and extend therebetween as shown. A rear strut 184 is attached to the right rear leg 128 and the left rear leg 158 and extends therebetween. A curved grab rail 190 may also be attached to the right vertical strut 122 and the left vertical strut 152 and extend therebetween. The grab rail 190 may provide a convenient means for moving the infant-supporting chair 100 into a desired location. In the illustrated arrangement, the legs, struts and connectors are fabricated from extruded metal such as aluminum or other suitable materials and are coupled together by screws 186 or other suitable fastener arrangements. In other arrangements, connectors may comprise lockable hinge assemblies that facilitate folding of the vertical struts and/or the legs relative thereto.

Figure 30:
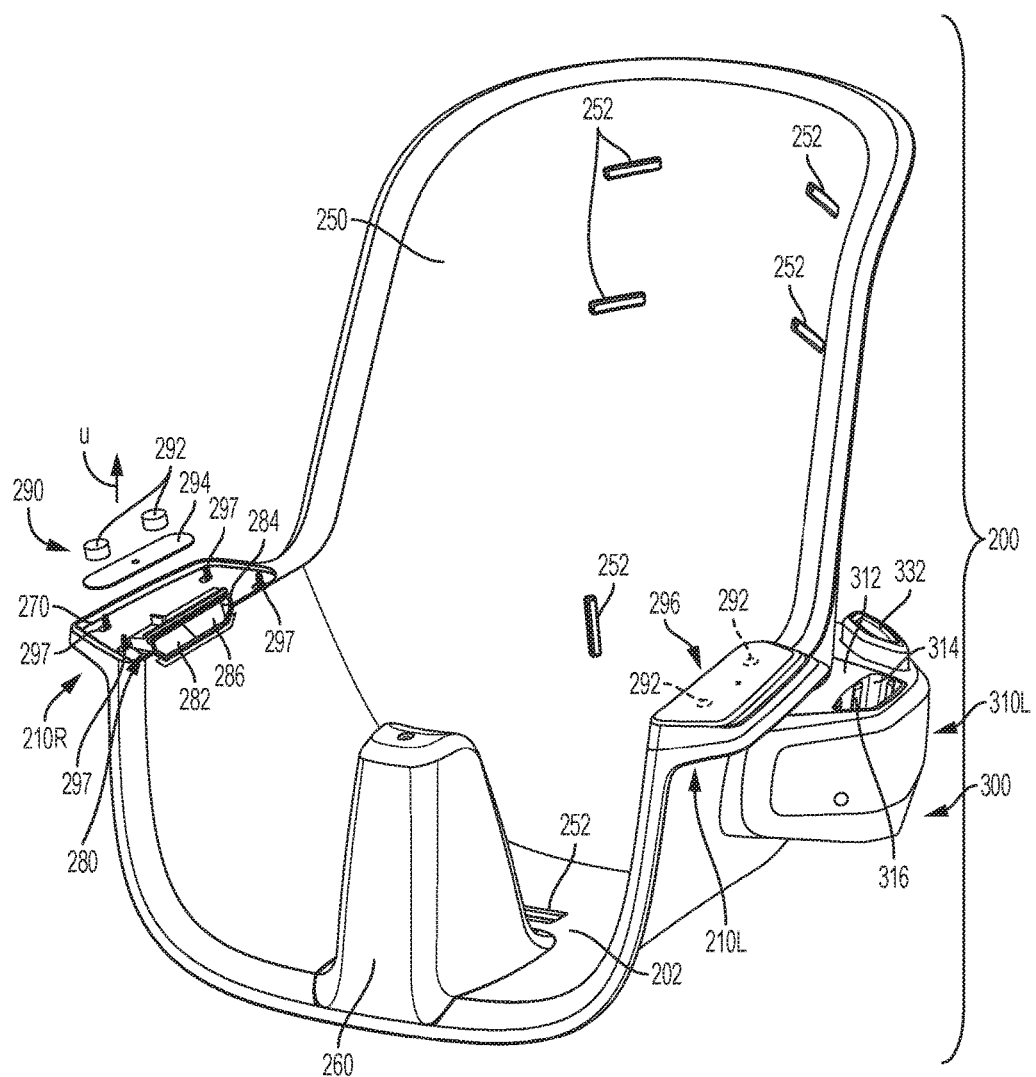
FIG. 30 is a perspective and partial exploded view of the seat of FIG. 25 depicting a retaining post and a pair of magnetics in an armrest of the seat.

Referring now to FIG. 30, the seat 200 includes a base 202 and a "first" or right armrest 210R and a "second" or left armrest 210L that extend from opposite sides of the seat base 202. An infant (or "occupant") can be seated on the base 202 between the right and left armrests 210R, 210L of the seat 200. The seat 200 also includes a backrest 250 that extends upward from a rear side of the base 202. The backrest 250 is configured to support an infant (or occupant) positioned in the seat 200 in an upright and/or seated position. In other arrangements, the seat 200 may not include a backrest. In the illustrated embodiment, the seat 200 includes a restraint post 260 that extends upward from the base 202. The restraint post 260 may be configured to assist in securing and restraining an infant or occupant who is positioned in the seat 200. In various arrangements, the seat 200 may be fabricated from plastic polypropylene, acrylonitrile butadiene styrene ("ABS"), polyoxymethylene ("POM"), nylon polystyrene (Nylon PS), etc. wherein the restraint post 260 is integrally formed therewith. In other embodiments, the restraint post 260 is attached to the base by screws, bolts snap features, etc. for assembly purposes and to facilitate positioning of the restraint post 260 in multiple positions on the seat and/or detachment therefrom or it may be non-removably affixed to the base by adhesive, rivets, etc. The seat may also include a removable insert cushion. In at least one arrangement, for example, the insert cushion comprises a one-piece seat insert that is conformed to at least a portion of the seat and is removable for cleaning purposes. In still other embodiments, the seat insert may be formed in multiple pieces from a cushion material or materials.

In various embodiments, the seat 200 may employ a "multiple-piece" restraint system of the types and configurations described hereinabove or other conventional restraint systems to secure and position the infant or occupant within the seat 200. In the illustrated embodiment, a plurality of apertures 252 are provided in the backrest 250 to allow for the various pieces (webs) of the restraint system to pass therethrough. For example, in some embodiments, the restraint system may include two arm straps and one buckle. Further as was discussed hereinabove, magnets, hook and loop arrangements, etc. may be attached to or otherwise incorporated into the backrest 250 or other portions of the seat 200 as well as into the various web portions and/or buckles or clasps of the restraint system to retain the portions of the restraint system in predetermined "ready" positions that facilitate relatively unobtrusive access to the seat 200. Details concerning the attachment and use of the various retraining system disclosed herein were discussed in detail above and will not be repeated again for the sake of brevity.

Figure 31:
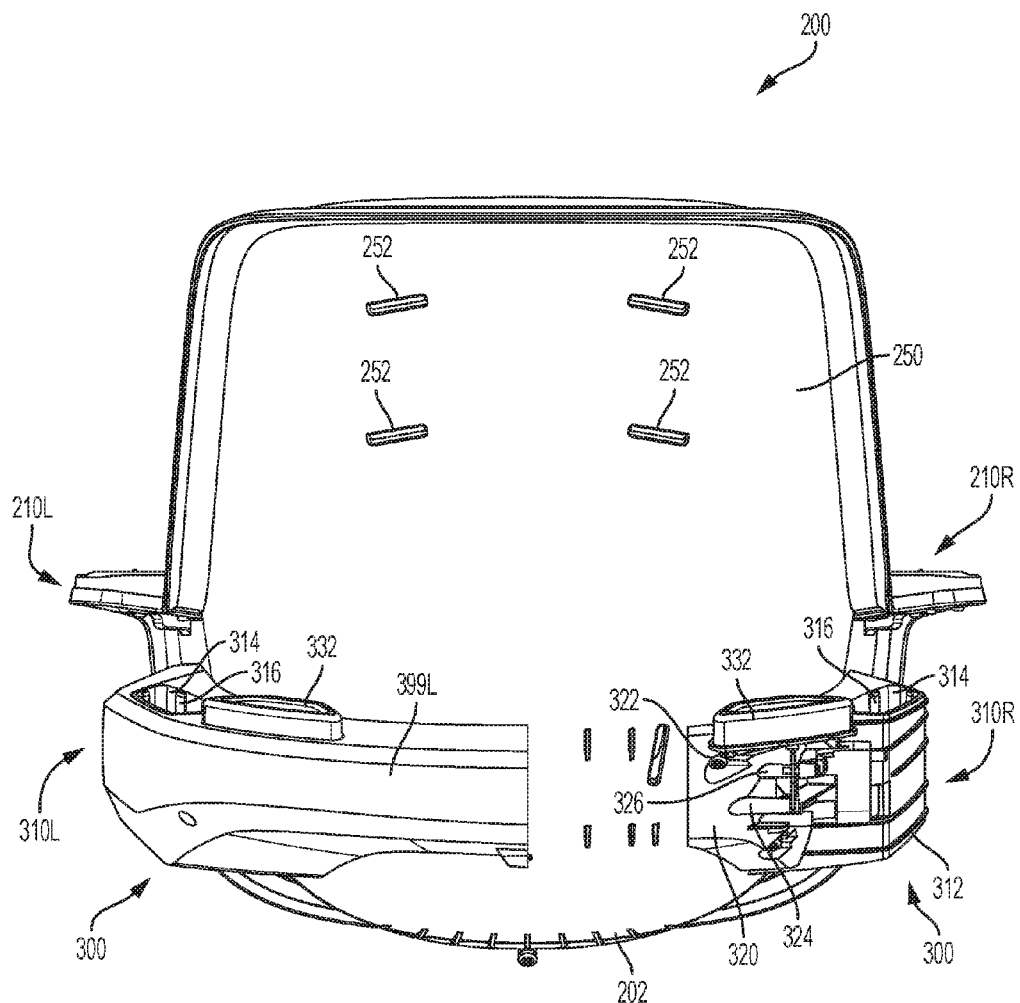
FIG. 31 is a rear view of the seat of FIG. 30 with one of the rear housing assemblies removed for clarity.
Figure 32:
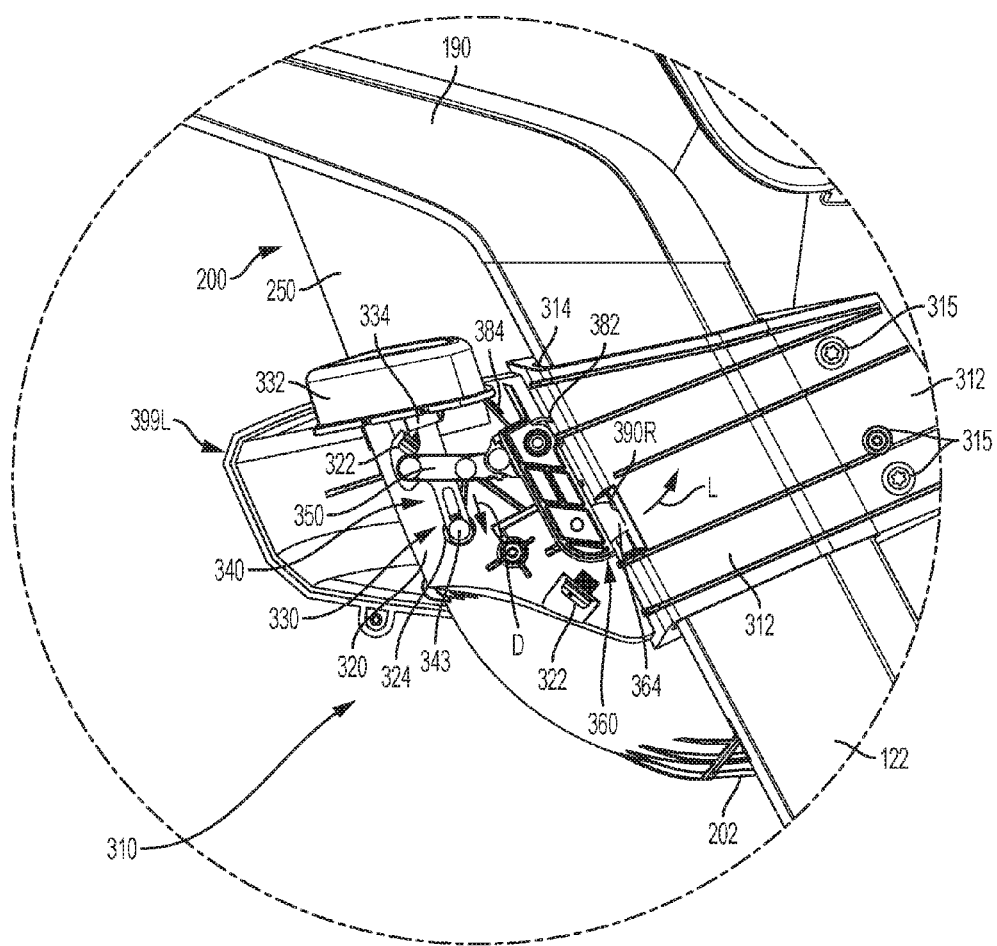
FIG. 32 is a partial right side view of the chair assembly of FIGS. 25-30 with the right housing assembly omitted and with the hook assembly thereof in retaining engagement with the right vertical strut of the frame assembly.
Figure 33:
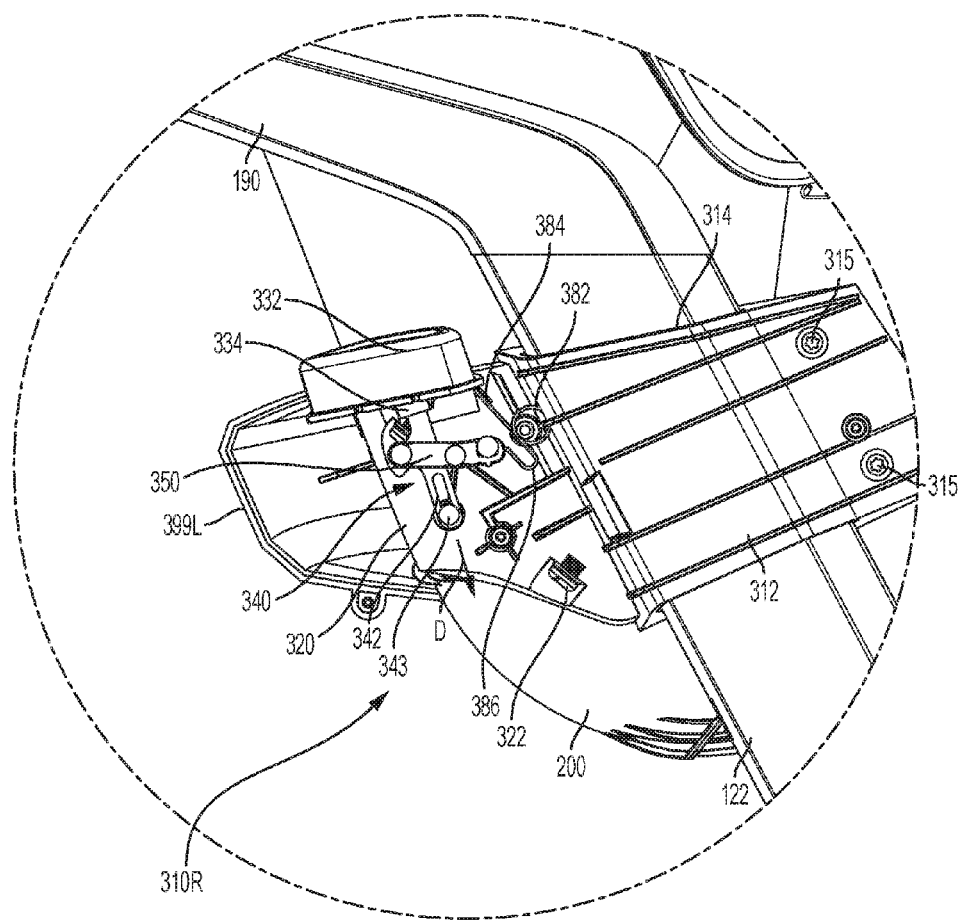
FIG. 33 is another partial right side view of the chair assembly of FIGS. 25-32 with the right housing assembly omitted and with portion of the hook assembly omitted for clarity.
Figure 34:
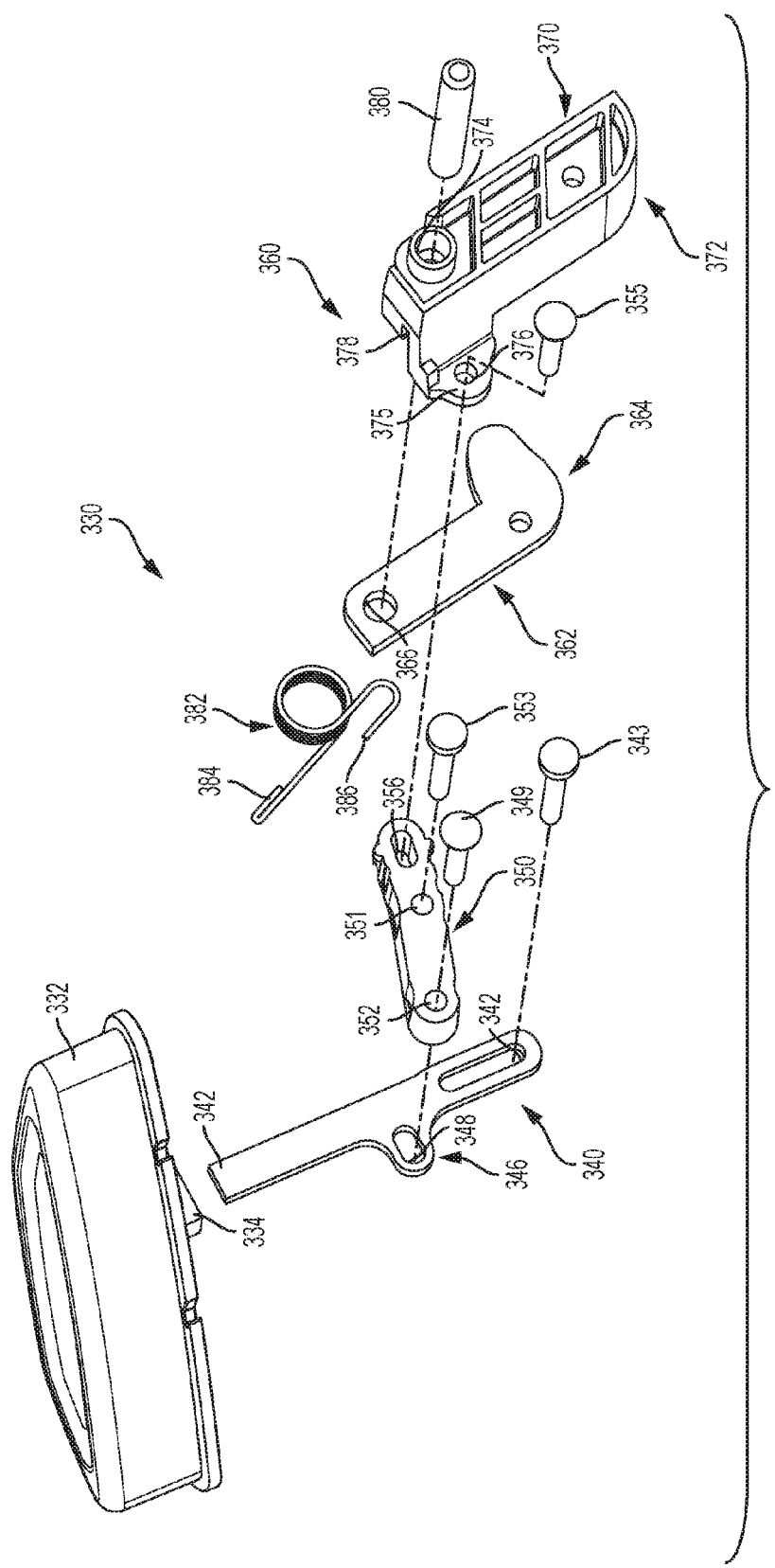
FIG. 34 is an exploded view of a releasable linkage assembly embodiment.
Figure 35:
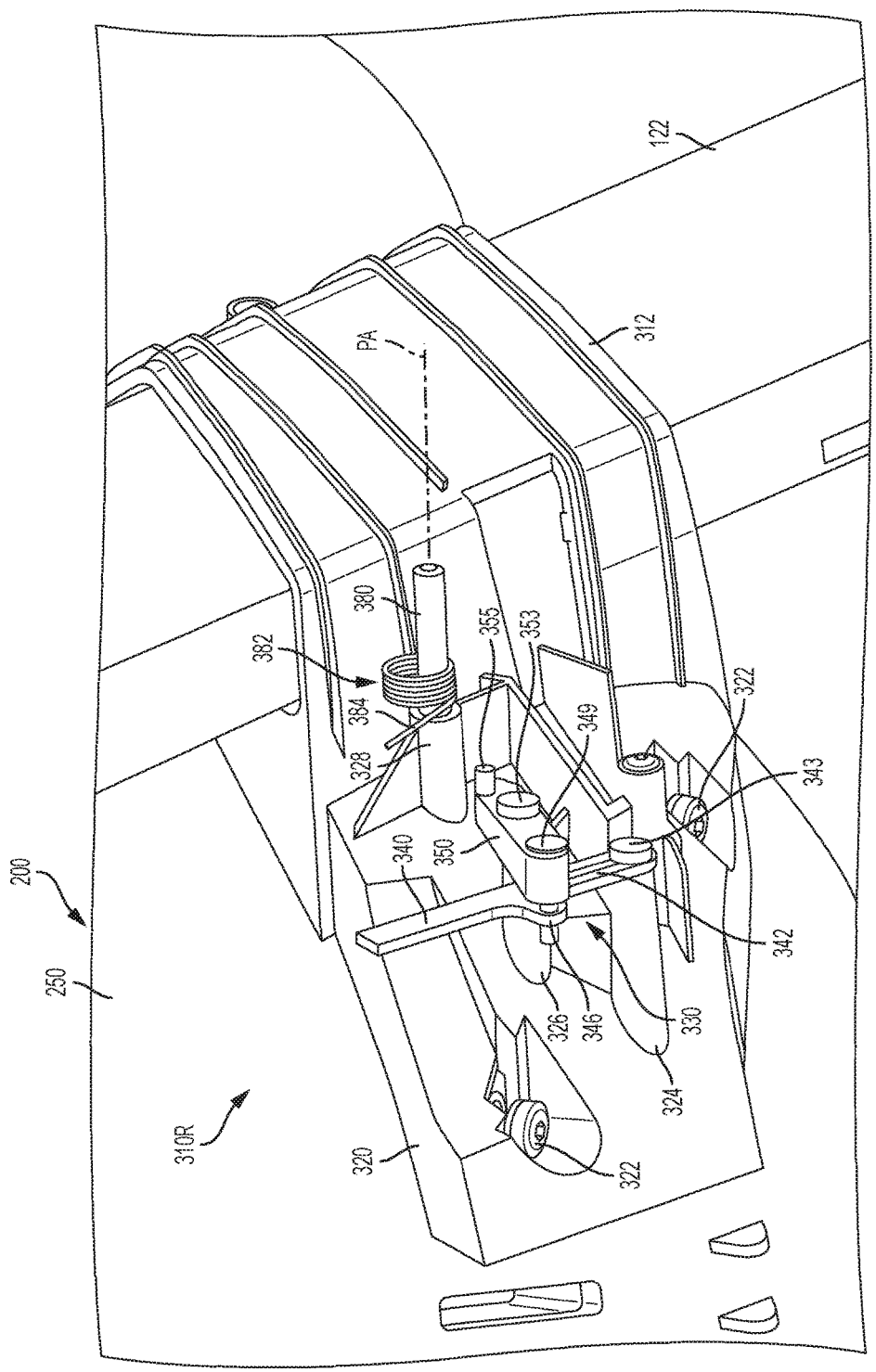
FIG. 35 is a partial perspective view of a portion of the chair assembly of FIGS. 25-34 with portions of the releasable linkage assembly omitted for clarity purposes.

In the illustrated arrangement, the seat 200 is movably coupled to the frame assembly 110 by a seat positioning system generally designated as 300. See FIG. 29. In at least one embodiment, for example, the seat positioning system 300 comprises a "first" or right seat latching assembly 310R and a "second" or left seat latching assembly 310L. See FIG. 30. In the illustrated arrangement, the right and left seat latching assemblies 310R, 310L are identical in construction and operation and are "mirror images" of one another. FIGS. 32-35, illustrate various portions of the right seat latching assembly 310R. As can be seen in FIGS. 32, 33 and 35, the right seat latching assembly 310R includes a seat sleeve 312 that is configured to slidably engage the right vertical strut 122. The seat sleeve may, for example, be molded from plastic polyoxymethylene ("POM"), polycarbonate ("PC"), polycarbonate-acrylonitrile butadiene styrene ("PC-ABS"), polypropylene, acrylonitrile butadiene styrene ("ABS"), nylon, glass filled ("GF") nylon, etc. In other embodiments, the seat sleeve 312 is machined or otherwise formed from metal material such as steel, aluminum, etc. In the illustrated embodiment, the seat sleeve 312 defines a strut socket 314 that is configured to slidably receive therein the right vertical strut 122 (or left vertical strut 152) therethrough. The seat sleeve 312 is attached to the seat 200 by screws 315 or other suitable fasteners. As can be seen in FIGS. 30 and 31, the strut socket 314 may be formed with a series of spaced vertical glide ribs 316 to minimize the contact area between the right vertical strut 122 (or left vertical strut 152) and the strut socket 314 and reduce the amount of friction established therebetween.

Referring again to FIGS. 31-33 and 35, the seat sleeve 312 includes a rear mounting flange portion 320 that wraps around a portion of the backrest 250 and is attached thereto by screws 322 or other suitable fasteners. Operably attached to the rear mounting flange portion 320 is a releasable linkage assembly 330. In the illustrated arrangement, the releasable linkage assembly 330 includes a latch button 332 that has a vertical link 340 attached thereto. In one arrangement for example, the latch button 332 has a button socket 334 molded therein that is adapted to frictionally receive a top end 342 of the vertical link 340 therein. The vertical link 340 may be fabricated from steel and the latch button 332 may be molded from plastic material, for example. As can be seen in FIGS. 32-35, the vertical link 340 includes an elongated bottom slot 342 that is configured to receive a first attachment pin or fastener 343 therein. As can be seen in FIG. 35, the fastener 343 is received in an attachment post 324 that is formed on the rear mounting flange portion 320. Such arrangement permits the vertical link 340 to move downwardly (arrow "D" in FIGS. 32, 33) when the latch button 332 is depressed. The releasable linkage 330 further includes a central pivot link 350 that is pivotally attached to the vertical link 340. In particular, the vertical link 340 includes a central attachment lug portion 346 that has a slotted aperture 348 therethrough. See FIG. 34. A rivet/pin 349 extends through a hole 352 in the central pivot link 350 and the slotted aperture 348 in the vertical link 340 to movably affix the central link 350 to the vertical link 340. See FIG. 35. The central link 350 is pivotally affixed to the rear mounting flange portion 320 by a pivot pin 353 that extends through a central pivot hole 351 to be received in an attachment post 326 formed on the rear mounting flange portion 320.

Each latching assembly 310R, 310L further includes a hook assembly 360 that is configured to releasably engage the corresponding vertical strut 122, 152. As can be seen in FIG. 34, the hook assembly 360 in at least one embodiment includes a metal body 362 that has a hook portion 364 that is configured to be received within a slot in the corresponding vertical strut 122, 152 as will be discussed in further detail below. In the illustrated arrangement, the metal body 362 is supported in a molded hook carrier 370. In particular, a pivot pin 380 extends through a hole 374 in the carrier body 372 and a pivot hole 366 in the metal body 362 to be received within a post 328 that is formed in the rear mounting flange portion 320. See FIGS. 34 and 35. The pivot pin 380 defines a pivot axis "PA" about which the hook assembly 360 can pivot. The hook assembly 360 is operably coupled to the central link 350 by a pivot pin/rivet 355 that extends through a pivot hole 376 that is formed in an attachment tab 375 that is formed on the carrier body 372. The pivot pin 355 extends through a slot 356 that is formed in the central link 350.

Figure 27:
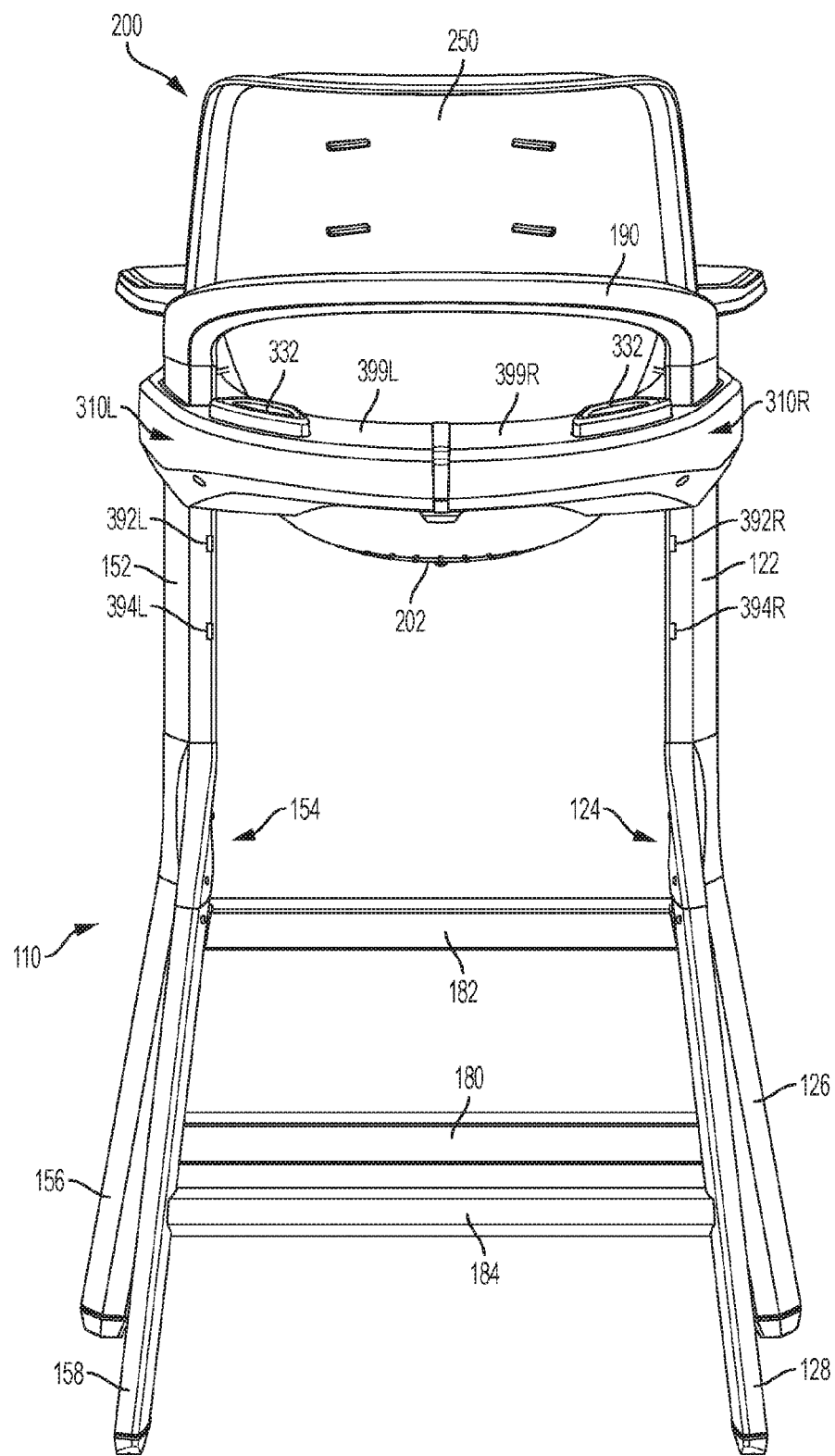
FIG. 27 is a rear elevational view of the chair assembly of FIGS. 25 and 26 with the seat latched in its uppermost position.
Figure 28:
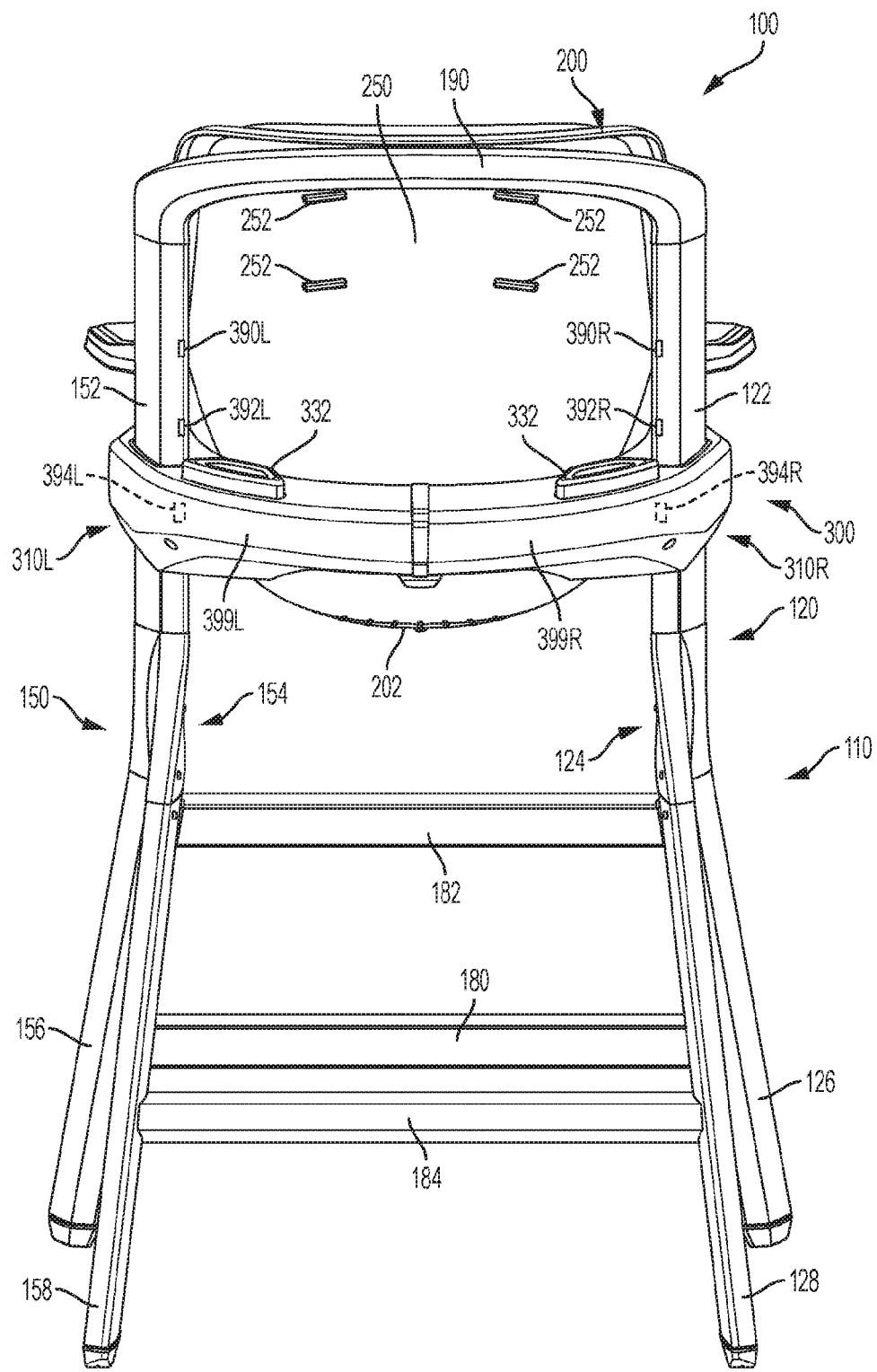
FIG. 28 is another rear elevational view of the chair assembly of FIGS. 25-27 with the seat thereof in its lower-most latched position.
Figure 29:
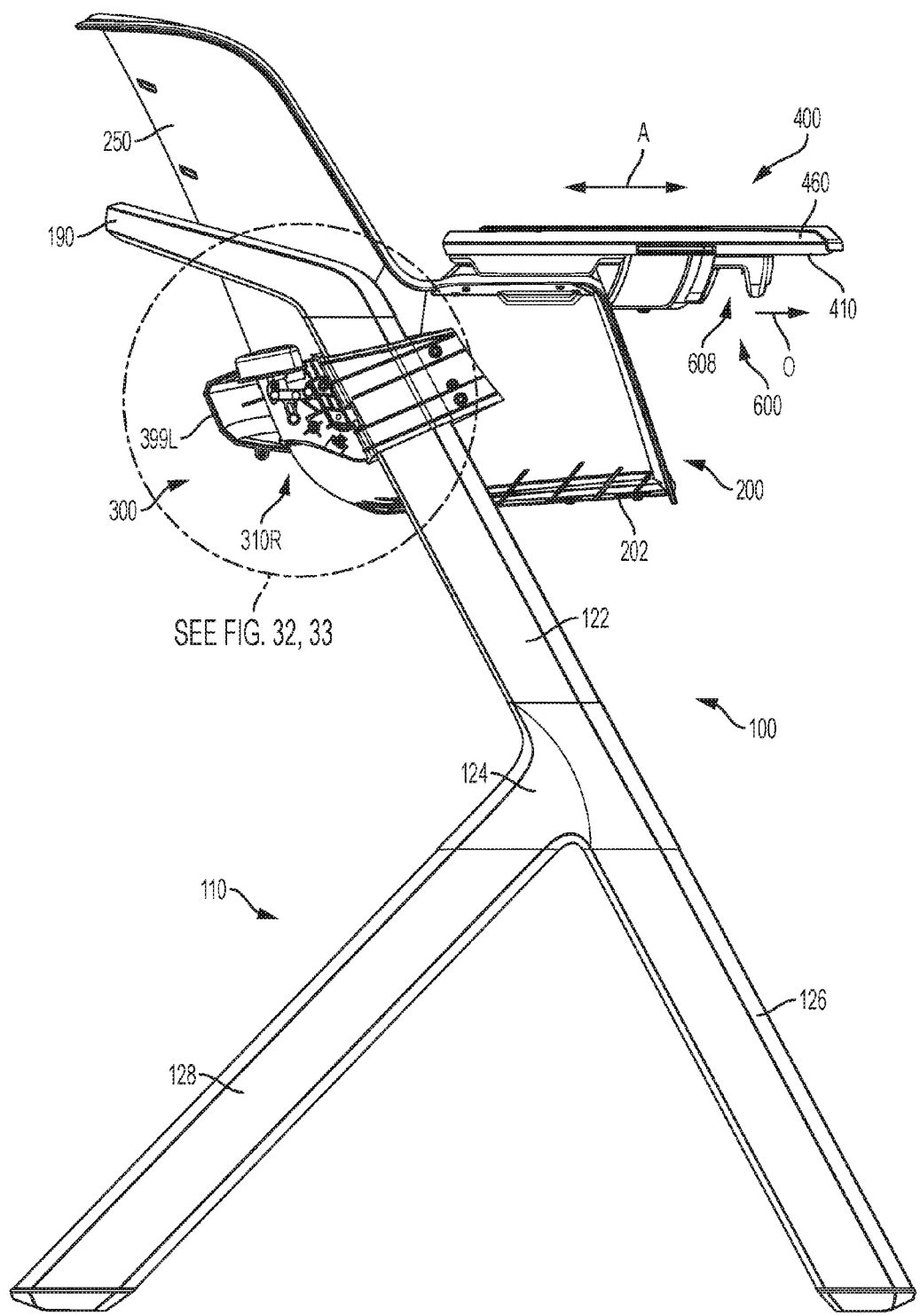
FIG. 29 is a side elevational view of the chair assembly of FIGS. 25-28.

Referring now to FIGS. 27 and 28, each of the vertical struts 122, 152 include a plurality of discrete hook slots therein that are configured to be hookingly engaged by the hook assembly 360 of the corresponding seat latching assembly 310R, 310L. More specifically, vertical strut 122 has a serious of "first" slots 390R, 392R, 394R therein and vertical strut 152 has a series of "second" slots 390L, 392L, 394L therein. The uppermost slot 390R in the vertical strut 122 is in the same location (or height) as the uppermost slot 390L in the vertical strut 152 so that when the seat latching assemblies 310R and 310L, respectively are in retaining engagement therewith, the seat 200 and tray assembly 400 that is attached thereto will be relatively level. Likewise, the middle slot 392R in the vertical strut 122 is in the same location (or height) as the middle slot 392L in the vertical strut 152 so that when the seat latching assemblies 310R and 310L are in retaining engagement therewith, the seat 200 and tray assembly 400 attached thereto will be relatively level. The bottom-most slot 394R in the vertical strut 122 is in the same location (or height) as the bottom-most slot 394L in the vertical strut 152 so that when the seat latching assemblies 310R and 310L are in retaining engagement therewith, the seat 200 and tray assembly 400 that is attached thereto will be relatively level. Other numbers of slots may be employed, provided that an equal number of slots are provided in each of the vertical struts 122, 152 and they are located in corresponding predetermined locations (heights). In at least one arrangement, for example, the uppermost slots 390R, 390L are located so that when the seat latching assemblies 310R, 310L are in retaining engagement therewith, the tray assembly will be located at a standard table height of, for example, approximately thirty (30) inches above the floor surface.

Referring again to FIGS. 32-35, the hook assembly 360 is biased into hooking engagement with a corresponding slot 390R/390L, 392R/392L or 394R/394L by a torsion spring 382 that is journaled on the pivot pin 380. A first leg 384 of the torsion spring 382 is received with a spring slot 378 in the carrier body 372 (FIG. 34) and a second leg 386 of the torsion spring 382 abuts the seat sleeve 312 (FIG. 33). The torsion spring 382 serves to bias the metal body 362 in the locking direction "L" (FIG. 32) to retain the hook portion 364 thereof in retaining engagement with the corresponding slot 390R/390L, 392R/392L or 394R/394L in the corresponding vertical strut 122, 152. As can be seen in FIG. 27, "first" and "second" housing segments 399R, 399L are attached to the backrest 250 of the seat 200 to enclose the corresponding latching assembly 310R, 310L. In the illustrated embodiment, to adjust the height of the seat 200, the user must simultaneously depress the latch buttons 332 on the latching assemblies 310R, 310L to disengage the hook assemblies 360 from the corresponding slots 390R/390L, 392R/392L or 394R/394L in the vertical struts 122, 152 and then move the seat 200 to the desired height corresponding to the next pair of slots 390R/390L, 392R/392L or 394R/394L in the vertical struts 122, 152. As can be seen in FIG. 34, the end of each of the hook portions 364 is rounded so that it can freely ride along the vertical strut 122, 152 until the hook portion 364 encounters the next slot 390R/390L, 392R/392L or 394R/394L in the corresponding vertical strut 122, 152 at which time the torsion springs 382 will automatically bias the hook portions 364 into their corresponding slots 390R/390L, 392R/392L or 394R/394L. As such, once the user has depressed the latch buttons 332 to disengage the hook portions 364 and then begins to reposition the seat 200, there is no need for the user to continue to depress the latch buttons 332 as the hook portions 364 will automatically be biased into retaining engagement with the next pair of corresponding slots 390R/390L, 392R/392L or 394R/394L in the vertical struts 122, 152. In the illustrated embodiment, should a sibling or other individual depress the latch button 332 of only one of the latching assemblies 310R, 310L, the seat 200 will not drop because the hook portion 364 of the other latching assembly 310R, 310L will remain engaged. If there is an infant or occupant in the seat 200, their weight will cause the sleeve 312 of the unlatched latching assembly 310R, 310L to frictionally bind with the corresponding vertical strut 122 or 152 to further prevent any inadvertent dropping of the seat 200. Such arrangement, therefore, may prevent a sibling or other individual from unlatching the seat 200 when a child is sitting in the seat, for example unless the sibling or other individual simultaneously depresses the latch buttons 332 on each of the latching assemblies 310R, 310L. To that end, when the hook portions 364 are hooked into engagement with a respective slot 390R/390L, 392R/392L or 394R/394L and a child or infant is supported in the seat 200, the weight of that occupant makes it more difficult to move the linkage assembly 330 to a disengaged position. However, other embodiments could conceivably employ a single latch button (centrally located in the back of the seat 200 for example) that is operably coupled to the hook assemblies 360 in each of the latch assemblies 310R, 310L so that when the single latch button is depressed or otherwise actuated, the hook assemblies 360 of both latch assemblies 310R, 310L disengage from their corresponding vertical strut 122, 152.

Returning again to FIG. 30, as indicated above, the seat 200 includes a "first" or right armrest 210R and a "second" or left armrest 210L. Each of the armrests 210R, 210L has a cavity 270 molded therein that is configured to accommodate a female latch piece 280 that has a latch receptacle 282 formed therein. The latch receptacle 282 is defined by a relatively flat or planar upper surface 284 and a beveled lower surface 286 which will be discussed in further detail below. The latch receptacle 284 in each armrest 210R, 210L faces inwardly toward the restraint post 260. As can also be seen in FIG. 30, a magnet assembly or a "first arrangement of magnetic elements" 290 is also supported within the cavity 270. In the illustrated arrangement, the first arrangement of magnetic elements 290 comprises first and second seat magnetic elements 292 that comprise permanent magnets that are attached to a ferromagnetic bar 294 which helps to spread and direct the magnetic force in an upward direction (represented by arrow "U" in FIG. 30). Other shapes, numbers and configurations of magnets/ferromagnetic materials may be employed. To complete the installation, an arm cover plate 296 is attached to the corresponding armrest 210R, 210L by screws 297 or other suitable fastener arrangements.

Figure 37:
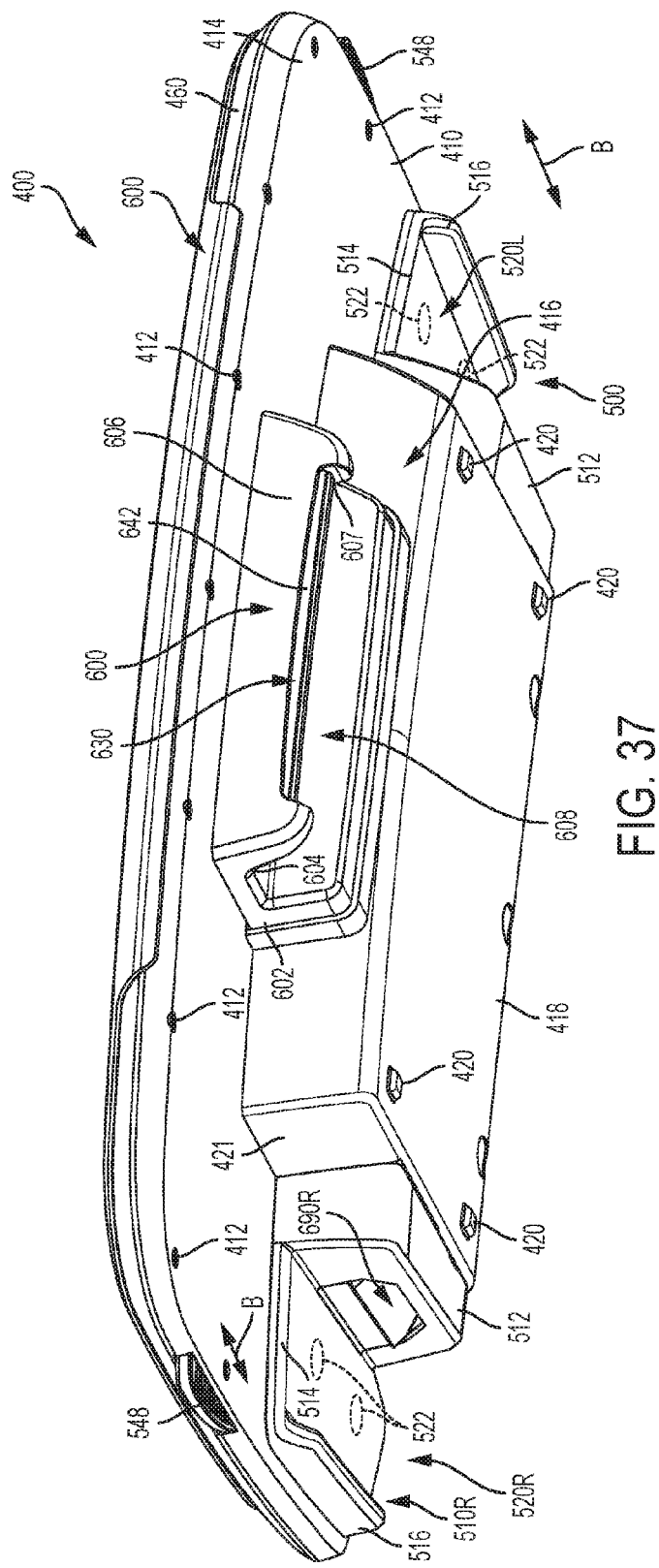
FIG. 37 is a lower front perspective view of a tray assembly embodiment.
Figure 38:
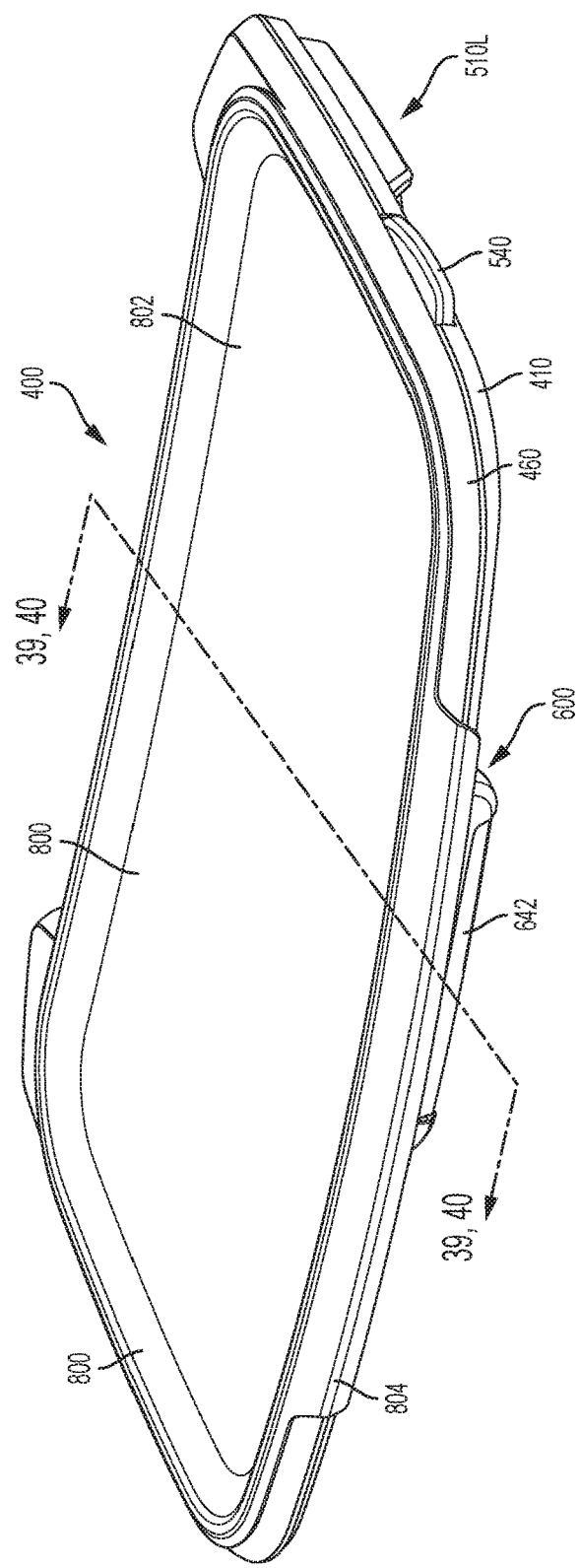
FIG. 38 is an upper front perspective view of the tray assembly embodiment of FIG. 37.
Figure 41:
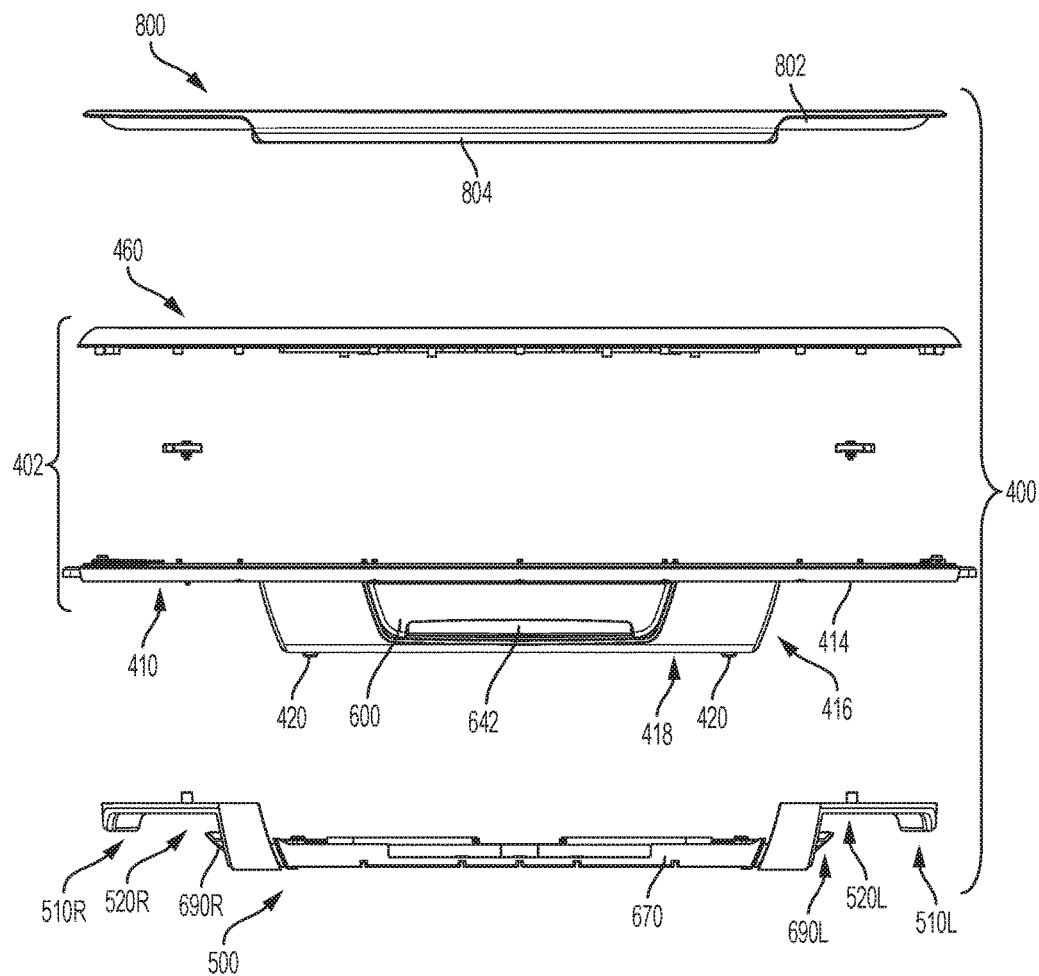
FIG. 41 is an exploded front elevation view of the tray assembly embodiment of FIGS. 38-40.
Figure 42:
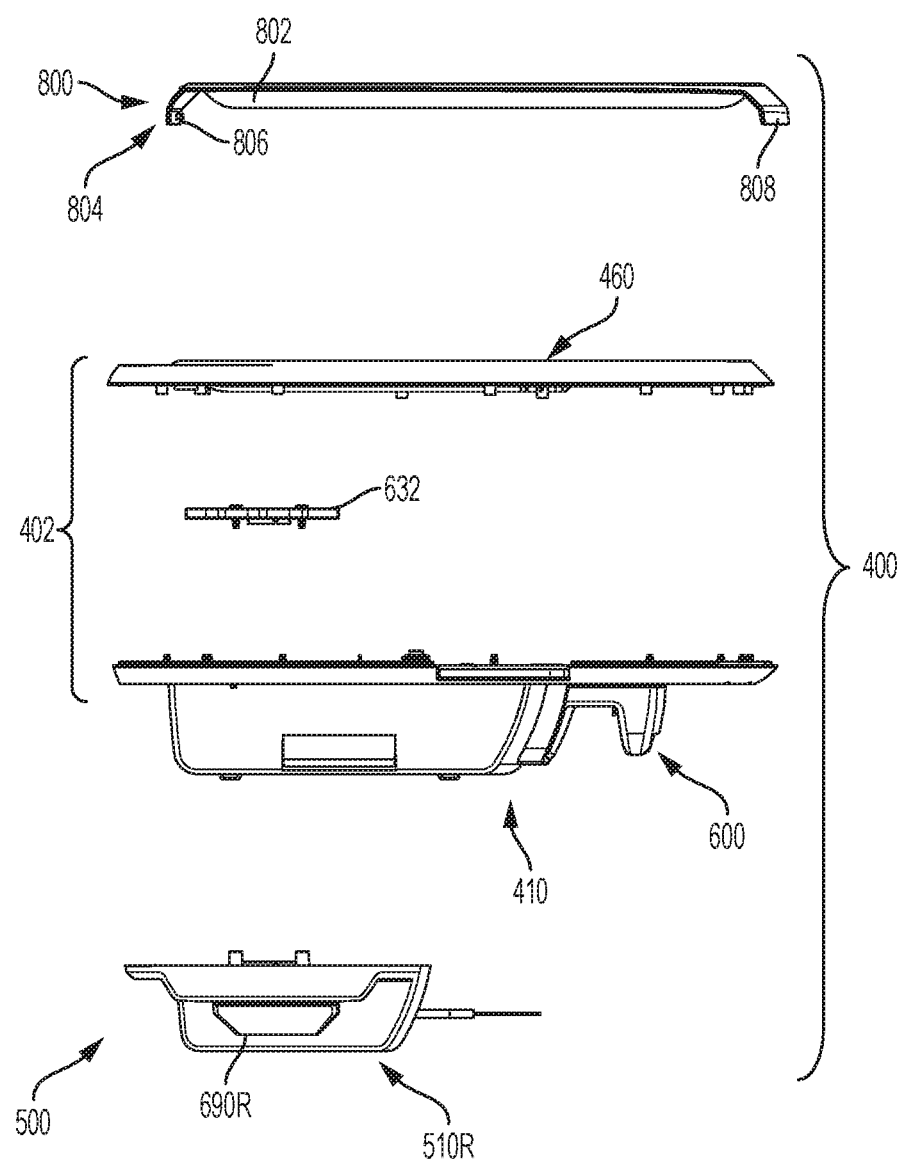
FIG. 42 is an exploded side elevational view of the tray assembly embodiment of FIGS. 38-41.

As indicated above, the chair assembly 100 also includes a tray assembly 400, which is configured to be releasably mounted to the armrests 210R, 210L of the seat 200. Referring now to FIGS. 41 and 42, the illustrated tray assembly 400 includes a tray body 402, a tray latching system 500 and a tray liner 800 that is configured to be removably coupled to the tray body 402 as will be discussed in further detail below. In the illustrated arrangement, the tray body 402 may comprise a tray base portion 410 and a tray top portion 460 that is attached to the tray base portion 410. In at least one embodiment, for example, the tray base portion 410 and the tray top portion 460 may be molded from plastic polypropylene, acrylonitrile butadiene styrene ("ABS"), polyoxymethylene ("POM"), nylon, etc. and are interconnected together to form the tray body 402 by a plurality of fasteners, such as screws 412. Other fastener arrangements, however, such as snap features, rivets, etc. could also be employed to couple the tray base 410 to the tray top 460. In the illustrated embodiment, the tray base 410 includes a planar bottom portion 414 and a latch housing portion 416 that also has a planar bottom surface 418 that is spaced from the bottom portion 414. See FIG. 37. In addition, a plurality of feet 420 are formed in the bottom surface 418 for facilitating support of the tray assembly 400 on a surface such as a table top or countertop, etc. when the tray assembly 400 has been detached from the seat 200. The bottom portions 414 and 418 may each have a relative smooth outer surface texture that facilitates easy cleaning.

Figure 43:
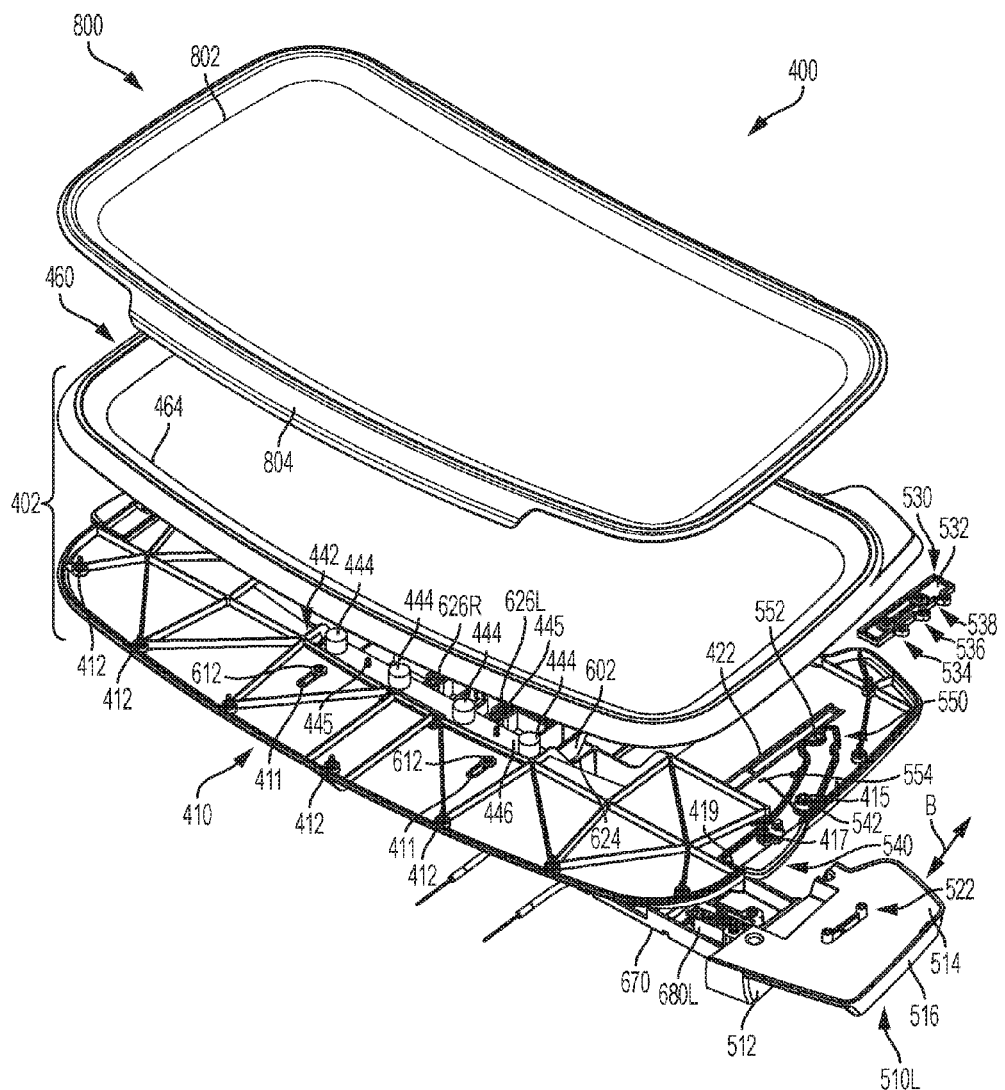
FIG. 43 is an exploded perspective view of the tray assembly embodiment of FIGS. 38-42 with a tray bottom and a cartridge removed to expose portions of a latching assembly embodiment and a portion of a magnetic assembly embodiment.
Figure 44:
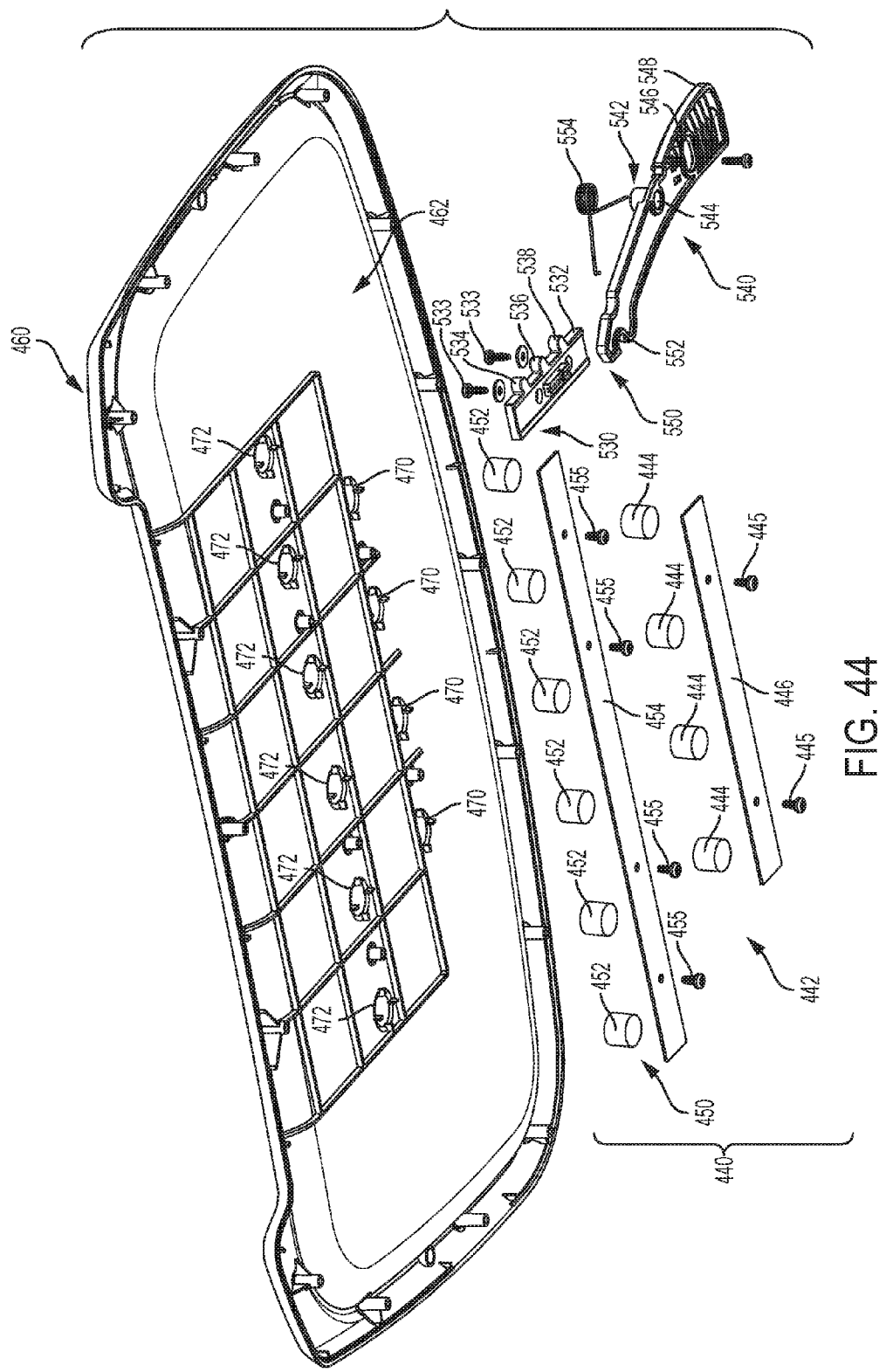
FIG. 44 is a bottom perspective view of portions of the tray assembly embodiment of FIGS. 38-43.

As can be seen in FIGS. 43 and 44, in the illustrated embodiment, the tray body 402 includes a utensil retainer or magnet assembly 440 for magnetically interacting with magnets or ferromagnetic components in various utensils, cups, bowls, etc. as was described above. The magnet assembly 440 includes at least one magnet that is supported within the tray body 402. In the illustrated embodiment, for example, two rows 442, 450 of permanent magnets are employed. As can be seen in FIG. 44, the front row 442 includes four permanent magnets 444 that are received in corresponding sockets 470 that are molded into the underside 462 of the top tray portion 460. Each magnet 444 is received within a corresponding socket 470 and is retained therein by a first piece or bar of ferromagnetic material 446 that is retainingly attached to the tray base portion 410 by screws 445 or other suitable fasteners or fastener arrangements. The bar 446 may serve to retain each magnet 444 within its corresponding socket 470 and also helps to spread and direct the magnetic force generated by the magnets 444 in an upward direction so as to form a larger/stronger region of magnetic attraction within the tray assembly 400. As can be seen in FIG. 44, in the illustrated embodiment, the second row 450 includes six permanent magnets 452 that are received in corresponding sockets 472 that are molded into the underside 462 of the top tray portion 460. Each magnet 452 is received within a corresponding socket 472 and is retained therein by a second piece or bar of ferromagnetic material 454 that is retainingly attached to the tray base portion 410 by screws 455 or other suitable fasteners or fastener arrangements. Like the first bar 446, the second bar 454 may serve to retain each magnet 452 within its corresponding socket 472 and may also help to spread and direct the magnetic force generated by the magnets 452 in an upward direction so as to form a corresponding larger/stronger second region of magnetic attraction within the tray assembly 400. The first and second bars 446, 454 may be fabricated from, for example, ferrous steel or stainless steel. The number of rows and number of magnets in each row may vary. In alternative embodiments, only one row or more than two rows of magnets may be employed. In still other embodiments, only one magnet may be employed. The type, shape and strength of the magnets may also vary. In still other arrangements, a piece or pieces of ferromagnetic material may be supported between the upper tray portion and the lower tray portion or be otherwise embedded within the tray body 402 for establishing magnetic attraction with specific magnets that are embedded or otherwise attached to various utensils, bowls, plates, etc. The magnet assembly 440 of the illustrated embodiment helps to minimize the weight of the tray assembly 400 while establishing regions of magnetic attraction in desirable locations within the tray assembly 400.

In the illustrated embodiment, the tray latching system 500 includes a U-shaped "first" or right docking member 510R and a U-shaped "second" or left docking member 510L. See FIGS. 36 and 37. The right and left docking members 510R, 510L are identical in construction and each includes a latch box portion 512, a planar top portion 514 and a downwardly extending, lateral docking lip 516 that serve to define a docking area 520R, 520L. See FIG. 36. In the illustrated embodiment, for example, each of the docking members 510R, 510L may be molded from plastic polyoxymethylene ("POM"), acrylonitrile butadiene styrene ("ABS"), nylon, etc. However, the docking members 510R, 510L may be fabricated from other materials utilizing other manufacturing techniques. Each docking member 510R, 510L includes an arrangement of magnetic elements or features generally designated as 517. In the illustrated embodiment, for example, the arrangement of magnetic elements 517 comprises at least one and preferably a plurality of docking magnets 518 that are embedded in or otherwise mounted to the planar top portion 514 of each docking member 510R, 510L. As will be discussed in further detail below, the right docking member 510R is configured to receive the top portion of the right armrest 210R therein and the left docking member 510L is configured to receive the top portion of the left armrest 210L therein to facilitate mechanical latching of the tray assembly 400 to the seat 200 by the tray latching system 500. To facilitate "in and out" adjustment of the tray assembly 400 relative to the seat 200 (represented by arrow "A" in FIG. 29) after the tray assembly 400 has been latched to the seat 200, each docking member 510R, 510L is selectively movable between a plurality of latching positions.

Referring now to FIG. 43, each docking member 510R, 510L (only 510L can be seen in that Figure) has a three position latch piece 530 attached thereto. In the illustrated arrangement, the latch piece 530 may be molded from plastic polyoxymethylene ("POM"), acrylonitrile butadiene styrene ("ABS"), nylon, etc. and includes a body portion 532 that has three lugs 534, 536, 538 extending therefrom that correspond to each latch position. In other arrangements, fewer than three or more than three lugs/latch positions may be employed. An upstanding mounting member 522 is molded into or otherwise attached to each of the docking members 510R, 510L. Each mounting member 522 is sized to slidably protrude through a corresponding latch slot 422 formed in the corresponding bottom portion 414 of the tray base 410 and be attached to the corresponding latch piece 530 by screws 533 or other fasteners (FIG. 44). Such arrangement permits the docking members 510R, 510L to move relative to the tray base portion 410 in the directions represented by arrow "B" in FIGS. 37 and 43, for example.

Still referring to FIGS. 43 and 44, each of the latch pieces 530 are configured for selective retaining engagement with a corresponding latch arm 540 that is pivotally supported on the underside of the tray base portion 410. Each latch arm 540 may be molded from plastic polyoxymethylene ("POM"), acrylonitrile butadiene styrene ("ABS"), nylon, etc. or the latch arms may be fabricated from other suitable materials utilizing other manufacturing techniques. In the illustrated arrangement, each latch arm 540 has an upstanding mounting lug 542 that has a passage 544 therethrough for rotatably receiving an upstanding mounting post 415 that is formed on the underside of the tray base 410. Such arrangement permits the latch arm 540 to pivot about the mounting post 415. In the illustrated arrangement, a slot 546 is provided through the latching arm 540 to movably receive an upstanding stabilizing post 417 therethrough. See FIG. 43. The latching arm 540 further includes an engagement or button portion 548 that is accessible through a slot 419 in the tray base portion 410 to enable the user to apply an actuation motion or force thereto. The opposite end 550 of the latching arm 540 has an latch notch 552 formed therein that is configured for retaining engagement with the lug 534, 536, 538 on the latch piece 530. A torsion spring 554 is mounted on the mounting lug 542 and is configured to bias the end 550 of the latch arm 540 into engagement with the latch piece 530. Thus, once the tray assembly 400 is docked on or latched to the arm rests 210R, 210L of the seat 200, the user may depress the button portion 548 of each latch arm 540 inwardly to disengage the latch notch 552 from a corresponding one of the lugs 534, 536, 538 and then move the tray assembly 400 inward or outward (arrow "A" in FIG. 29) to another latching position whereby the latch notch 552 of each latch arm 540 engages the corresponding lug 534, 536 or 538 that corresponds to that tray position to once again lock the tray assembly 400 into that position.

Figure 36:
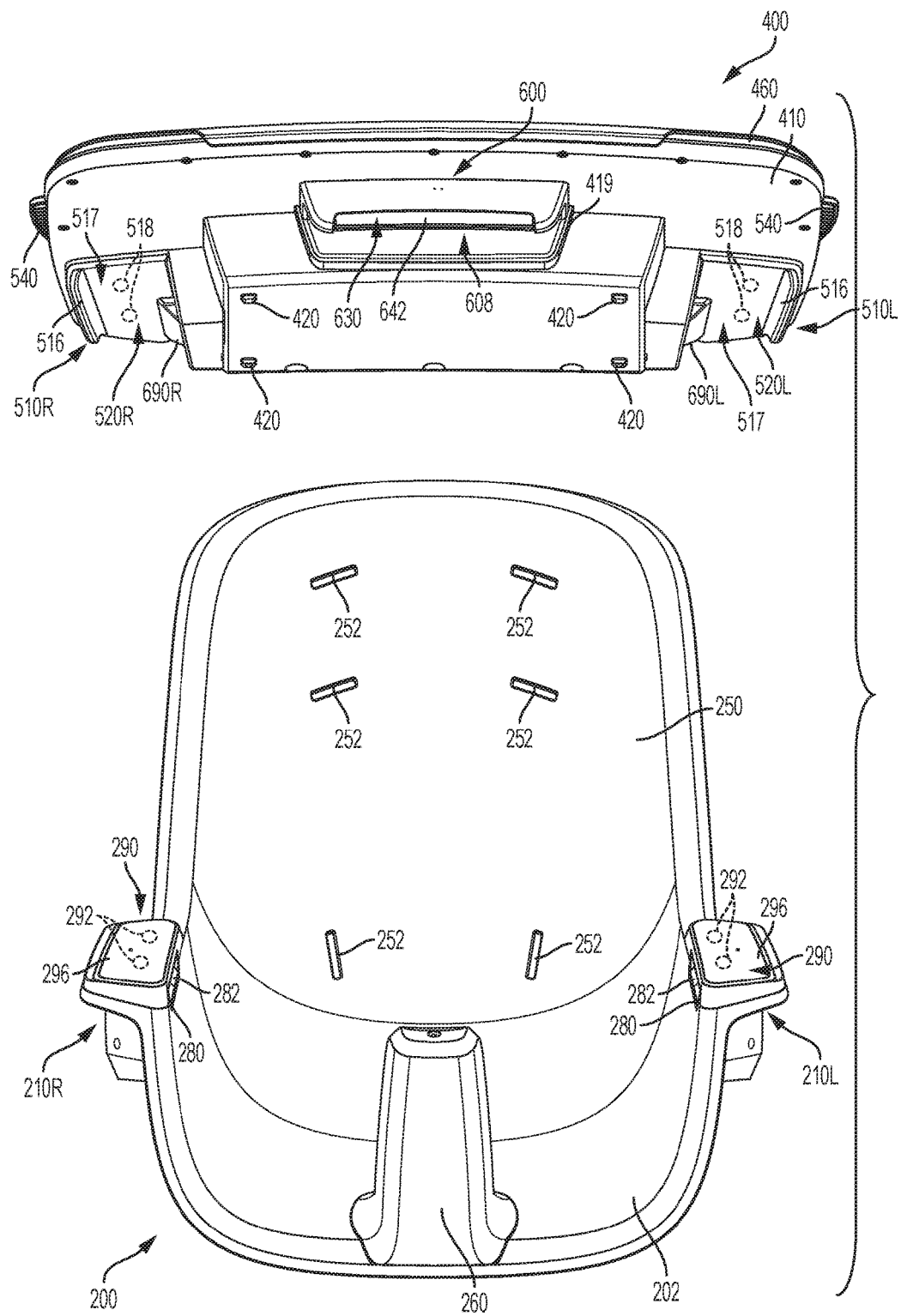
FIG. 36 is a front view of a seat embodiment and removable tray embodiment.
Figure 47:
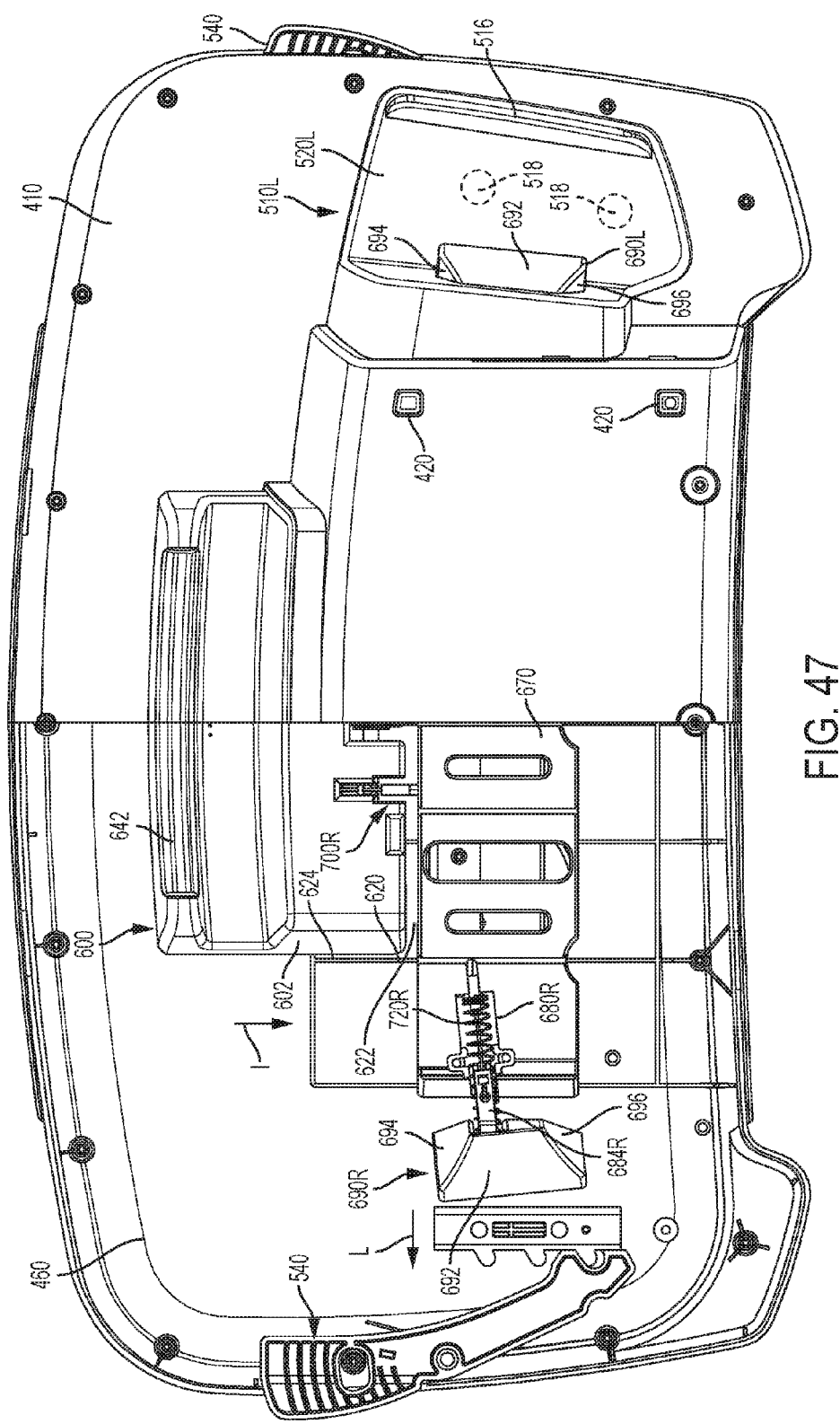
FIG. 47 is a bottom view of the tray assembly embodiment of FIGS. 38-42 with portions thereof omitted for clarity and with the central release button in an unactuated (latched) position.
Figure 48:
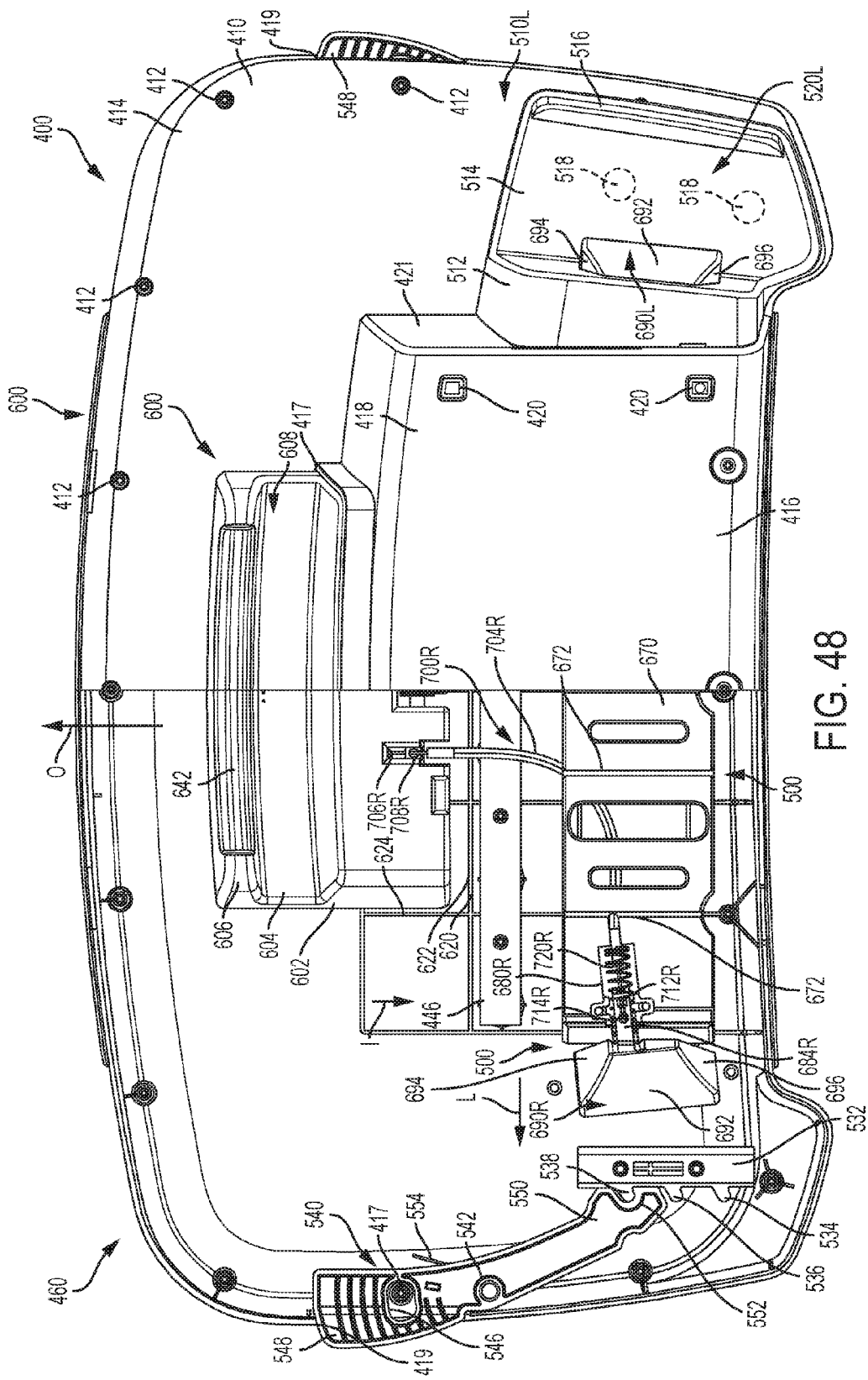
FIG. 48 is another bottom view of the tray assembly embodiment of FIGS. 38-42 and 47 with portion thereof omitted for clarity and with the central release button in an actuated (unlatched) position.

Turning next to FIG. 36, the tray latching system 500 further includes a central release button 600 that is configured to simultaneously operate a pair of latch members 690R, 690L that are configured to retainingly mate with the female latch piece 280 in the corresponding armrest 210R, 210L. In the illustrated arrangement, the central release button 600 may be molded from plastic acrylonitrile butadiene styrene ("ABS"), polyoxymethylene ("POM"), polypropylene, nylon, etc. and includes a body portion 602 that extends into the latch housing portion 416 of the tray base portion 410 through a slot 419 therein. A planar portion 604 protrudes outwardly from the body portion 602. A forward lip portion 606 extends downwardly from the planar portion 604 to form a U-shaped grasping area, generally designated as 608. As can be seen in FIGS. 47 and 48, the body portion 602 is sized to be received within a button cavity 620 in the tray base portion 410 that is defined by an upwardly protruding rear wall 622 and two side walls 624 that are molded in the underside of the tray base 410. A pair of screws 612 extend through slots 411 in the tray base portion 410 to be retainingly received within screw lugs 614 that are molded into the release button 600 to facilitate sliding attachment of the release button 600 to the tray base portion 410. See FIG. 43.

Figure 39:
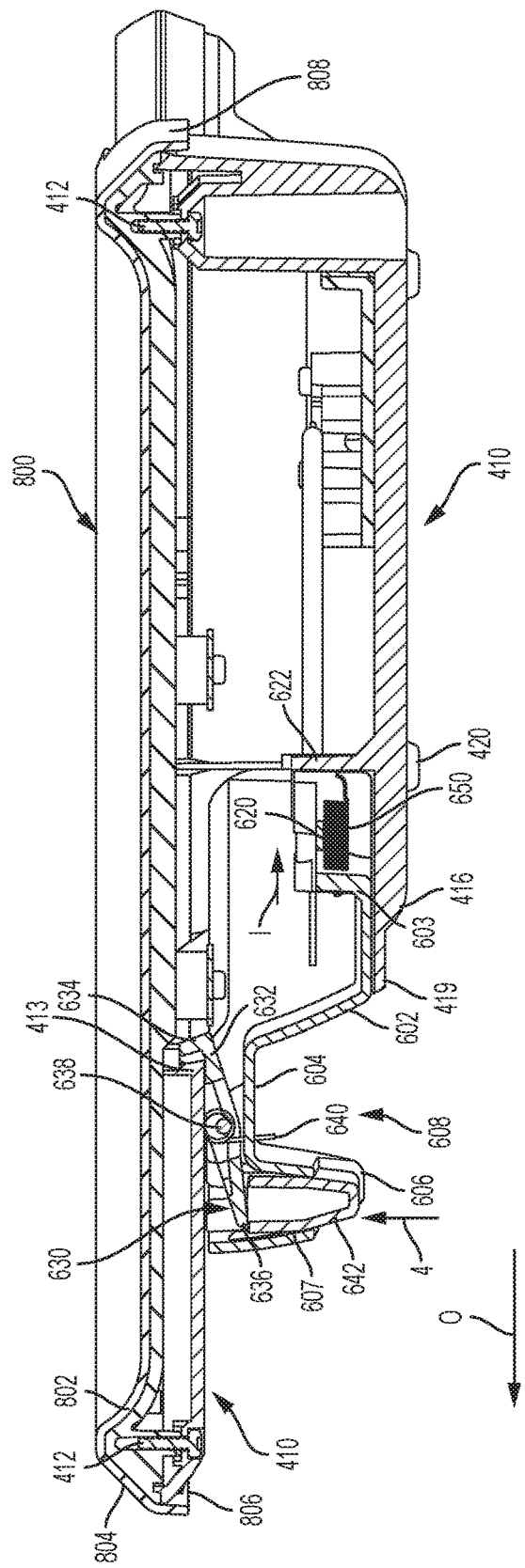
FIG. 39 is a cross-sectional side elevation view of the tray assembly embodiment taken along plane 39, 40 in FIG. 38, depicting the tray release assembly of FIG. 38 in an unactuated (latched) position.
Figure 40:
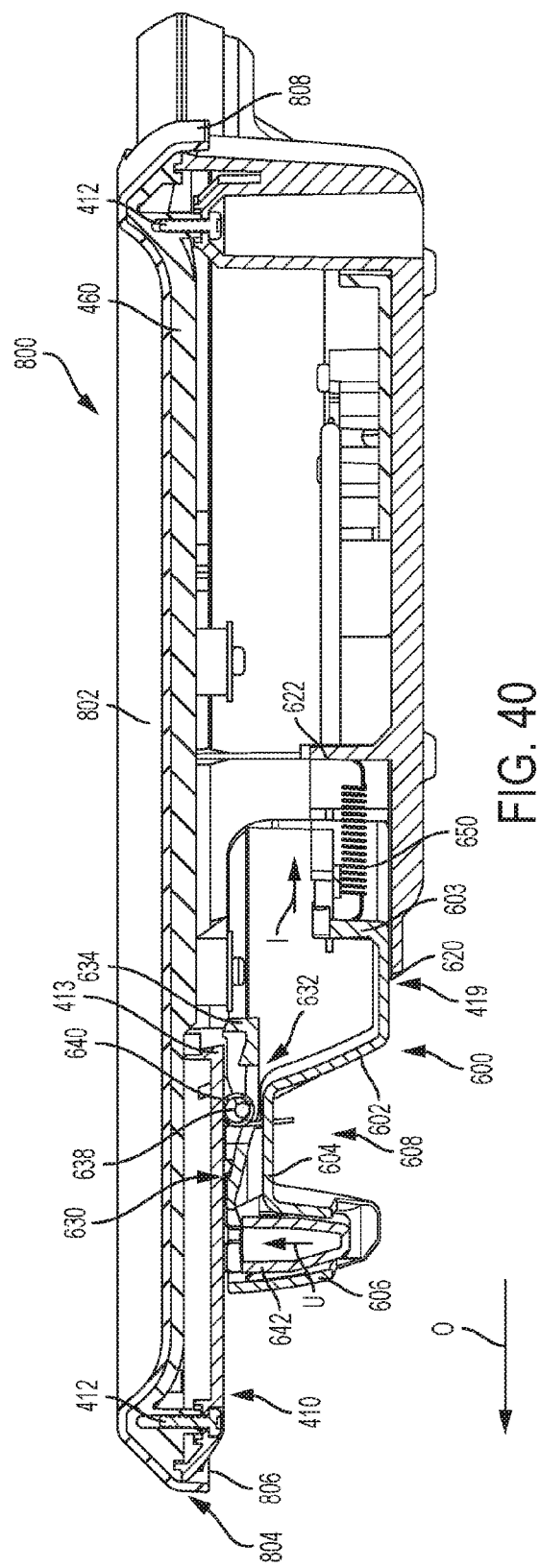
FIG. 40 is another cross-sectional side elevation view of the tray assembly embodiment taken along the plane 39, 40 in FIG. 38, depicting the tray release assembly embodiment in an actuated (unlatched) position.
Figure 46:
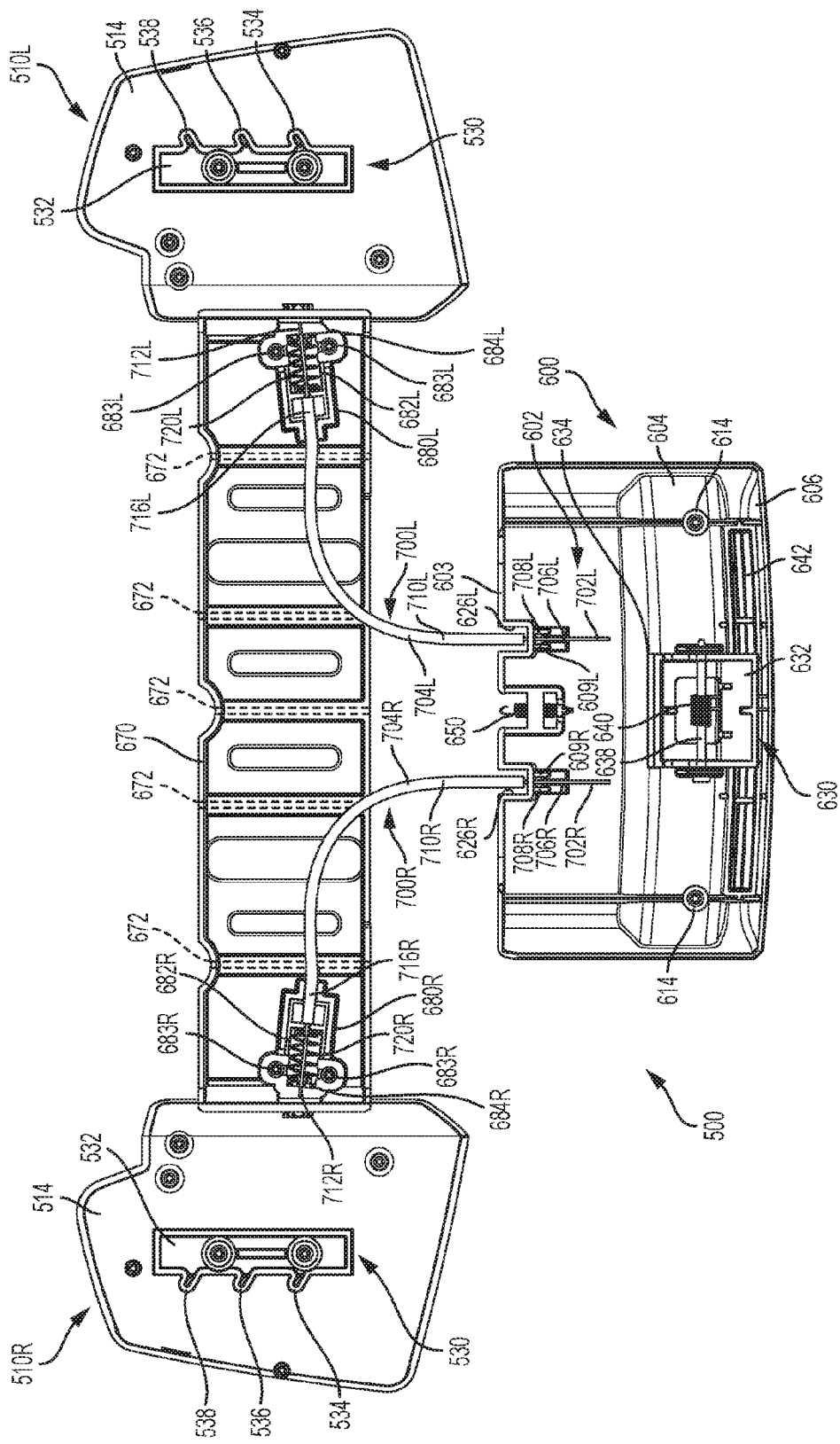
FIG. 46 is a plan view of a tray latching system embodiment.

The illustrated embodiment also employs a release button locking assembly 630 that is configured to releasably retain the central release button 600 in an unactuated position or "locked" position which may prevent inadvertent actuation of the central release button 600. As can be seen in FIGS. 39, 40 and 46, in one arrangement, the release button locking assembly 630 comprises a latch member 632 that is pivotally journaled on a latch shaft 638 that is mounted to the release button 600. The latch member 632 is may be molded from, for example, plastic polyoxymethylene ("POM"), acrylonitrile butadiene styrene ("ABS"), nylon, etc. and includes a retention lip 634 that is configured to retainingly engage a locking ledge portion 413 formed on the tray base portion 410. See FIGS. 39 and 40. A torsion spring 640 is journaled on the latch shaft 638 to bias the latch member 632 so that the retention lip 634 retainingly engages the locking ledge 413 on the tray base portion 410. A latch button 642 is movably received within an open bottomed cavity 607 in the forward lip portion 606 of the release button 600 and is configured to selectively engage a forward tab 636 on the latch member 632. When the latch button 642 is biased into its unactuated position by the torsion spring 640, the retention lip 634 is in retaining engagement with the locking ledge 413 and the forward tab 636 of the latch member 632 has biased the latch button 642 to the bottom of the cavity 607 wherein it may be accessed through the open bottom thereof. See FIG. 39. When the user desires to actuate the locking assembly 630, the user applies an unlocking motion to the latch button 642 by pressing the latch button 642 upward (arrow "U" in FIG. 39) to bias the latch member 632 to the unlatched position shown in FIG. 40. Thereafter, the user may then grasp the forward lip portion 606 of the central release button 600 and apply an "actuation" motion to it by pulling it outwardly to actuate the latch system 500 as will be discussed in further detail below.

Figure 45:
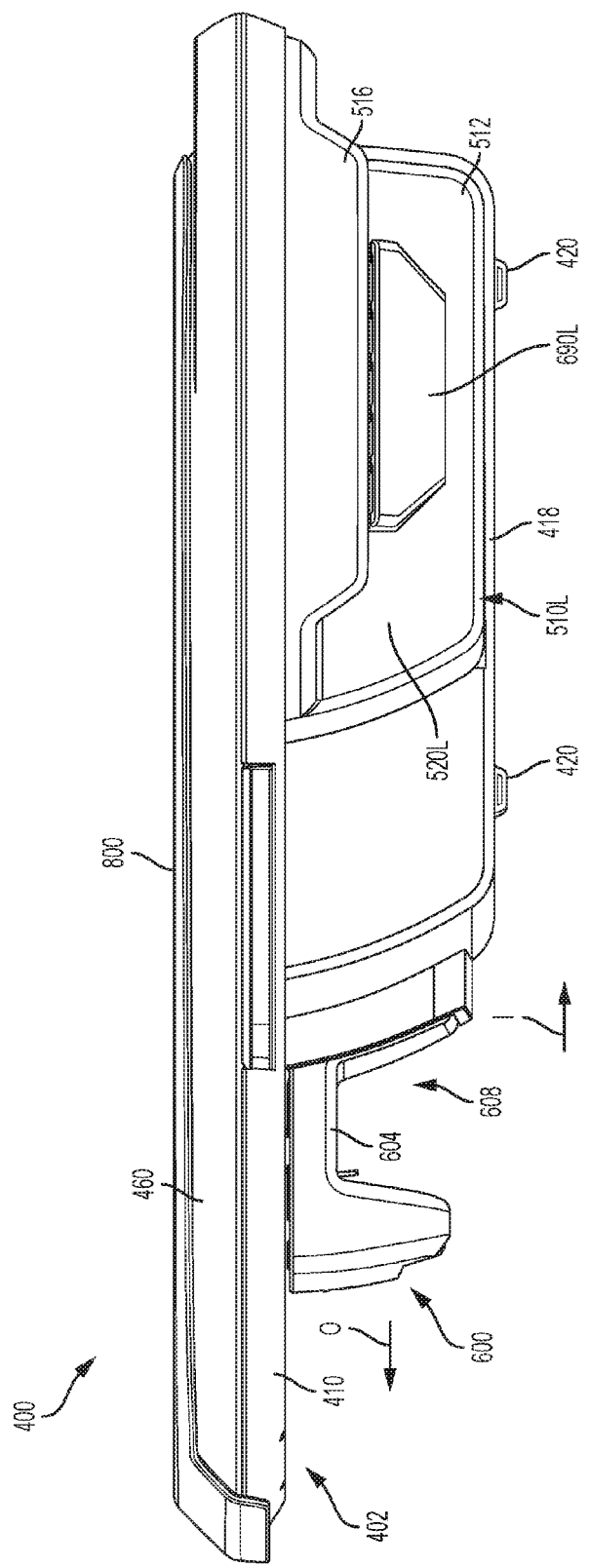
FIG. 45 is a side elevational view of the tray assembly embodiment of FIGS. 38-44.

As can be appreciated from the foregoing discussion, the central release button 600 can only be actuated in one direction (represented by arrow "O" in FIGS. 39, 40 and 45) and only then can it be actuated if the release button locking assembly 630 has been first actuated to disengage the release member 632 from retaining engagement with the locking ledge portion 413 of tray base portion 410. The person of ordinary skill in the art will appreciate that the unlocking motion is applied to the latch button in a "first" direction (e.g., upward) and the actuation motion is applied to the central release button 600 in a "second" direction (e.g., outward) that differs from the first direction. Such arrangement helps to further prevent the inadvertent actuation of the central release button 600. It will be further appreciated that the arrangement of the latch button 642 in the forward lip portion of the central release button 600 enables the unlocking motion and actuation motion to be simultaneously applied using the same hand. In the illustrated arrangement, a tension spring 650 is attached between the rear wall 603 of the body portion 602 of the release button 600 and the rear wall 622 that is molded on the upper side of the tray base 410. See FIGS. 39 and 40. Spring 650 serves to pull the central release button 600 inward (represented by arrow "I" in FIGS. 39 and 40) into its unactuated or locked position (FIGS. 39 and 47).

As was discussed above, the docking members 510R, 510L are configured to permit the tray base portion 410 to move relative to the docking members 510R, 510L to permit the tray body 402 to be moved inward or outward between discrete positions, while the tray assembly 400 remains attached to the armrests 210R, 210L of the seat 200. Referring again to FIGS. 46-48, in the illustrated embodiment, latch system 500 further includes a central carriage member 670 that is movably received within the latch housing portion 416 of the tray base 410. The carriage member 670 may be molded from plastic polyoxymethylene ("POM"), polypropylene, acrylonitrile butadiene styrene ("ABS"), nylon, etc. or other suitable material. To prevent the carriage member 670 from inadvertently skewing during actuation, the carriage member 670 may be molded with a plurality of slots 672 that are configured to slidably engage corresponding upstanding ribs (not shown) that are formed on the upper side of the tray base portion 410. The carriage member 670 is sized to slidably extend between the side walls 421 of the latch housing portion 416 of the tray base portion 410. As can be seen in FIG. 46, the carriage member 670 has a right latch housing 680R and a left latch housing 680L molded therein. The right latch housing 680R supports a right spring carrier 682R that slidably supports a cable connector 684R that is attached to a right latch member 690R. See FIGS. 47 and 48. The right spring carrier 682R is retained within the right latch housing 680R by screws 683R. See FIG. 46. Likewise, the left latch housing 680L supports a left spring carrier 682L that slidably supports a cable connector 684L that is attached to a left latch member 690L. The left spring carrier 682L is retained within the left latch housing by screws 683L.

Still referring to FIGS. 46-48, the tray latching system 500 of the illustrated embodiment further includes a right latching tether assembly 700R and a left latching tether assembly 700L. The right latching tether assembly 700R comprises a right flexible cable member 702R that extends through a flexible cable housing member 704R. In the illustrated embodiment, the right flexible cable member 702R may be fabricated from stainless steel, steel, aluminum, etc. and the right cable housing member 704R may be fabricated from nylon, polypropylene, etc., for example. A first end 706R of the right cable member 702R extends through a right socket 626R that is formed in the upstanding rear wall 622 of the tray base portion 410 and has a ferrule 708R crimped or otherwise attached thereto that is retainingly engaged with a corresponding right attachment post 609R that is formed on the underside of the central release button 600. A corresponding first end 710R of the flexible cable housing 704R is received within the right socket 626R and is retained therein by adhesive, such as a silicone adhesive or other suitable fastener arrangement. A second end 712R of the right cable member 702R extends through the right latch housing 680R and right spring carrier 682R to be coupled to the cable connector 684R by a ferrule 714R or other suitable fastener arrangement. A second end 716R of the cable housing 704R abuts the end of the right spring carrier 682R. A right coil spring 720R is journaled on the second end 712R of the cable 702R and is received within the right spring carrier 682R to apply a biasing force to the right cable connector 684R to bias the right cable connector 684R and the right latch member 690R that is attached thereto laterally outward (arrow "L" in FIGS. 47 and 48) into its latched position.

Likewise, the left latching tether assembly 700L comprises a left flexible cable member 702L that extends through a flexible cable housing member 704L. The left flexible cable member 702L as well as the left cable housing member 704L may be identical in composition and construction as the right flexible cable member 702R and the right cable housing member 704R, respectively. A first end 706L of the left cable member 702L extends through a left socket 626L formed in the upstanding rear wall 622 on the tray base portion 410 and has a ferrule 708L crimped or otherwise attached thereto that is retainingly engaged with a corresponding left attachment post 609L formed on the underside of the central release button 600. A corresponding first end 710L of the flexible cable housing 704L is received within the left socket 626L and is retained therein by adhesive, such as a silicone adhesive or other suitable fastener arrangement. A second end 712L of the left cable member 702L extends through the left latch housing 680L and left spring carrier 682L to be coupled to the left cable connector 684L by a ferrule (not shown) or other suitable fastener arrangement. A second end 716L of the left cable housing 704L abuts the end of the left spring carrier 682L. A left coil spring 720L is journaled on the second end 712L of the left cable 702L and is received within the left spring carrier 682L to apply a biasing force to the left cable connector 684L to bias the left cable connector 684L and the left latch member 690L attached thereto laterally outward (arrow "L") into its latched position.

In the illustrated arrangement, the right and left latch members 690R, 690L may be molded from plastic polyoxymethylene ("POM"), polypropylene, acrylonitrile butadiene styrene ("ABS"), nylon, etc. or other suitable material and are sized and shaped to retainingly engage the female latch member 280 in the corresponding armrest 210R, 210L of the seat 200. For example, each of the right and left latch members 690R, 690L are sized relative to the latch receptacle 282 in the female latch piece 280 to permit a portion of the latch member 690R, 690L to extend therein. To facilitate easy docking of each docking member 510R, 510L onto the corresponding armrest 210R, 210L, each of the latch members 690R, 690L are formed with a beveled lower portion 692 and a beveled forward edge 694 and a beveled rearward edge 696. When the tray assembly 400 is mechanically latched to the armrests 210R, 210L of the seat 200, the latch members 690R, 690L are latchingly engaged with the corresponding latching pieces 280 such that the beveled lowered portion 692 of each latch member 690R, 690L extends into the latch receptacle 282 of the corresponding latch piece 280.

In at least one of the embodiments, the tray assembly 400 is designed so that the user may manipulate the tray assembly 400 with a single hand. To attach the tray assembly 400 to the seat 200, for example, the tray assembly 400 may be oriented so that the right docking member 510R is adjacent to the right armrest 210R and the left docking member 510L is adjacent to the left armrest 210L. For example, the right docking member 510R may be located above the right armrest 210R in a position that is sufficiently close enough to the right armrest 210R to establish attraction between the magnet assembly 290 in the right armrest 210R and the docking magnets 518 therein. As the user positions the right docking member 510R relative to the right armrest 210R, the tray assembly 400 is also positioned so that the left docking member 510L is in the same position relative to the left armrest 210L. In various embodiments, the right docking member 510R may be spaced from (i.e., not in contact with) the right armrest 210R and the left docking member 510L may be spaced from the left armrest 210L in a plurality of positions, yet still establish a degree of magnetic attraction so as to direct or draw the right docking member 510R into latching engagement with the right armrest 210R and the left docking member 510L into latching engagement with the left armrest 210L. In at least one arrangement, the spacing distance (referred to herein as the "docking distance") may be approximately 15 mm, for example. It will be understood, however, that the magnitude of the docking distance as well as the positions of the tray assembly relative to the arm rests may be dictated by or otherwise affected by the number, strength and/or position of the magnets in the docking members and the armrests.

When the tray assembly 400 is being manipulated for attachment to the seat 200, the user may actuate the central release button 600 so as to draw the latch members 690R, 690L inwardly so as to reduce the distance in which each latch member 690R, 690L protrudes into the corresponding docking area 520R, 520L to further aid in the docking process. Once the docking members 510R, 510L are docked onto the right and left arms 210R, 210L, respectively, the user may release the central release button 600 to permit the latch members 690R, 690L to snap into retaining engagement with the latch receptacle 282 of the corresponding female latch piece 280 to thereby retainingly and mechanically latch the tray assembly 400 to the seat 200. However, those of ordinary skill in the art will also appreciate that the tray assembly 400 may be latched to the seat 200 without actuating the central release button 600.

For example, the user may position the tray assembly 400 so that the right docking area 520R is above the right arm 210R a "docking distance" and the left docking area 520L is above the left arm 210L a "docking distance" wherein magnetic attraction is established between the magnets 518 and the corresponding magnetic assembly 290 in each armrest. The user may then permit the tray assembly 400 to proceed downward so that the docking members 510R and 510L contact the right and left armrests 210R, 210L, respectively. The beveled portions 692, 694, 696 on each latch member 690R, 690L, upon contact with portions of the corresponding armrest, will help to bias the latch member 690R, 690L inwardly while the magnets 518 and magnet assemblies 290 facilitate alignment of the docking members 510R, 510L into positions wherein the latch members 690R, 690L may snap into latching engagement with the corresponding female latch pieces 280 in the armrests 210R, 210L. Such arrangement represents a vast improvement over prior high chair arrangements that require the user to precisely align attachment features on the bottom of the tray with corresponding rails on the chair.

Figure 25:
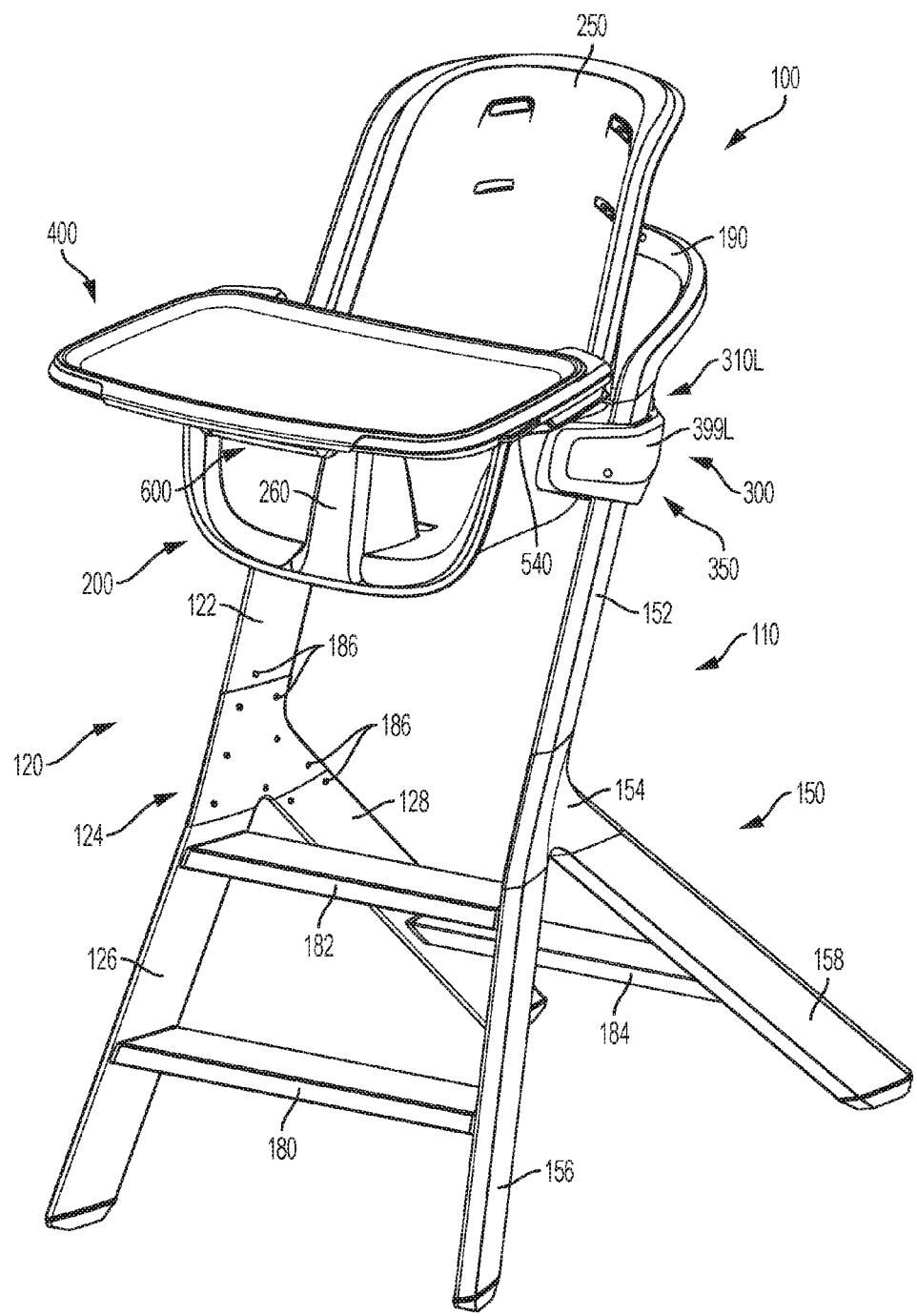
FIG. 25 is a perspective view of a chair assembly having a tray assembly attached to a seat according to at least one embodiment of the present disclosure.
Figure 26:
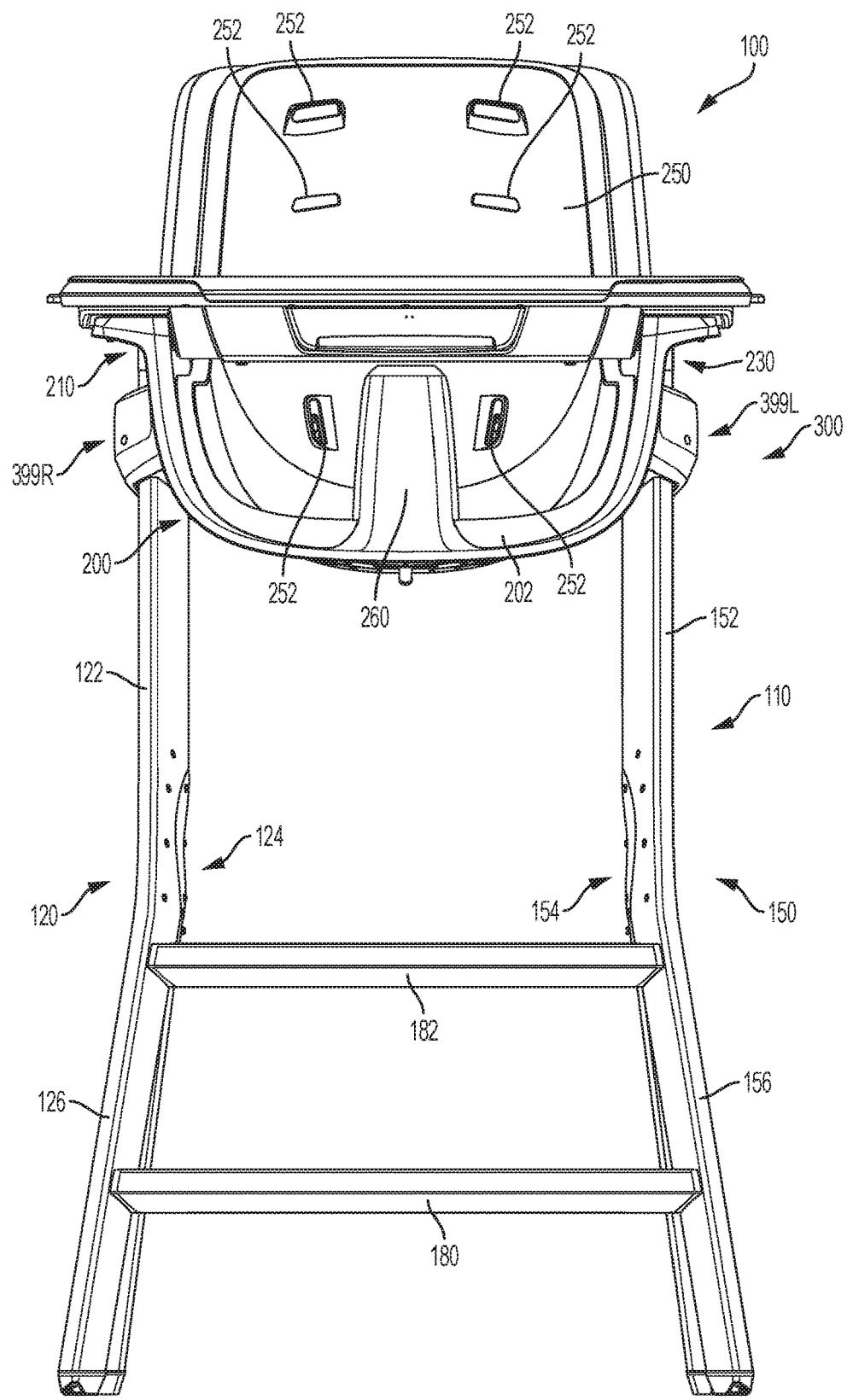
FIG. 26 is a front elevation view of the chair assembly of FIG. 25.

When the tray assembly 400 is mounted to the armrests 210R, 210L of the seat 200, as shown in FIGS. 25 and 26, the tray assembly 400 is configured to extend over the lap of an infant or occupant that is positioned in the seat 200. The tray assembly 400 is positioned on top of the seat 200 so that the legs of the infant or occupant are secured underneath the tray assembly 400 and in between the restraint post 260. The tray assembly 400 can support food, drinks, toys, and/or other accessories for the infant's or occupant's needs and/or entertainment. Objects positioned on the tray assembly may be easily accessible to an infant positioned in the seat 200. In various instances, the tray assembly 400 can be removed from the seat 200 to place an infant in the seat 200 and/or to remove an infant from the seat 200. Additionally or alternatively, the tray assembly 400 can be movable and/or adjustable relative to the seat 200.

The tray assembly 400 may be detached from the seat 200 by grasping the central release button 600 and pulling the release button 600 outwardly from the seat 200. However, before the central button 600 can be moved, the user must actuate the release button locking assembly 630 by pressing the latch button 642 upward within the forward lip portion 606 of the button 600. Such arrangement that employs two actuation motions that are essentially applied in different directions, serves to prevent the likelihood of inadvertent actuation by a sibling or other child or even by the occupant of the seat. For example, when the tray assembly 400 is attached to the seat 200, the latch button 642 must be depressed upwardly in direction "U" and continued to be sufficiently depressed, while the user pulls the central release button outward to de-latch the tray assembly 400 from the armrests 210R, 210L of the seat 200. These two actuation motions, however, can conceivably be applied using only one hand.

Once the tray assembly 400 has been detached from the seat 200, the tray assembly 400 may be conveniently supported on a table top or other flat surface. This represents a vast improvement over other tray assemblies that have a restraint post attached to the underside of the tray assembly.

As indicated above, the tray assembly 400 may also include a removable tray liner 800. As can be seen in FIGS. 39-43, the tray liner 800 is configured to snap onto tray top portion 460 of the tray assembly 400. In the illustrated arrangement, the tray liner 800 includes a dished central portion 802 that is configured to be received on the central dished portion 464 of the tray top portion 460. In addition, the tray liner 800 includes a downwardly extending, forward retention lip 804 that includes a catch portion 806 that is configured to releasably engage the undersigned of the top tray portion 460. In addition, the tray liner 800 also includes a rearward retention lip 808 that is configured to retainingly engage a corresponding rear portion of the top tray portion 460. The tray liner 800 may be relatively flexible in nature so as to facilitate easy detachment from the top tray portion 460. For example, the tray liner 800 may be made from any suitable material such as, but not limited to, flexible silicone.

EXAMPLES

Example 1

An infant-supporting chair comprising a seat that comprises a first arrangement of magnetic elements. The infant-supporting chair further comprises a tray assembly that is releasably mountable to the seat when the tray assembly is in an engaged position relative to the seat. The tray assembly comprises a tray latching system that is configured to releasably engage the seat. The tray assembly further comprises a second arrangement of magnetic elements, wherein the first arrangement of magnetic elements and the second arrangement of magnetic elements are configured to draw the tray assembly toward the engaged position when the tray assembly is in a range of positions relative to the seat that are sufficient to establish magnetic attraction between the first arrangement of magnetic elements and the second arrangement of magnetic elements.

Example 2

The infant-supporting chair of Example 1, wherein the first arrangement of magnetic elements comprises at least one first seat magnet and at least one second seat magnet, and wherein the seat further comprises first and second armrests, wherein the first armrest supports the at least one first seat magnet and the second armrest supports the at least one second seat magnet.

Example 3

The infant-supporting chair of Example 2, wherein the tray assembly comprises a first docking member that is configured to receive a portion of the first armrest therein and a second docking member that is configured to receive a portion of the second armrest therein. The second arrangement of magnetic elements comprises at least one first docking magnet that is supported by the first docking member and at least one second docking magnet is supported by the second docking member.

Example 4

The infant-supporting chair of Example 3, wherein the tray latching system comprises a first latch member that is associated with the first docking member and is configured for selective latching engagement with the first armrest. The tray latching system further comprises a second latch member that is associated with the second docking member and is configured for selective latching engagement with the second armrest.

Example 5

The infant-supporting chair of Example 4, wherein the seat further comprises a first latch receptacle in the first armrest for selective latching engagement with the first latch member and a second latch receptacle in the second armrest for selective latching engagement with the second latch member.

Example 6

The infant-supporting chair of Examples 4 or 5, wherein the tray latching system further comprises a release button that is movably supported on the tray assembly for selective movement between a locked position and actuated position and operably interfaces with the first and second latch members to selectively simultaneously disengage the first latch member from the first armrest and the second latch member from the second armrest when the release button is moved from the locked position to the actuated position.

Example 7

The infant-supporting chair of Example 6, wherein the release button is movable from the locked position to the actuated position upon application of an actuation motion thereto and wherein the latching system further comprises a release button locking assembly that operably interfaces with the release button to selectively retain the release button in the locked position until an unlocking motion is applied to the release button locking assembly.

Example 8

The infant-supporting chair of Example 7, wherein the unlocking motion is applied to the release button locking assembly in a first direction and wherein the actuation motion is applied to the release button in a second direction that differs from the first direction.

Example 9

The infant-supporting chair of Example 8, wherein the unlocking motion and the actuation motion may be applied to the release button locking assembly and the release button, respectively by a single hand.

Example 10

The infant-supporting chair of Examples 1, 2, 3, 4, 5, 6, 7, 8 or 9, wherein said tray latching system is configured to permit said tray assembly to move relative to said seat between a plurality of discrete tray positions relative to said seat while said tray latching system is in releasable engagement with said seat.

Example 11

The infant-supporting chair of Example 10, wherein the tray assembly comprises a tray body and a first docking member that is movably coupled to the tray body and is configured to receive a portion of the first armrest therein. In addition, the second arrangement of magnetic elements comprises at least one tray magnet that is supported on the first docking member. The tray latching system further comprises a first tray latch arm that is movably supported on the tray body and is configured for selective latching engagement with the first docking member to selectively retain the first docking member in any one of a plurality of latched positions relative to the tray body. A second docking member is movably coupled to the tray body and is configured to receive a portion of the second armrest therein. The second arrangement of magnetic elements also further comprises at least one other tray magnet that is supported on the second docking member. The tray latching system further comprises a second tray latch arm that is movably supported on the tray body and is configured for selective latching engagement with the second docking member.

Example 12

The infant-supporting chair of Examples 1, 2, 3, 4, 5, 6, 7, 8, 9, 10 or 11, further comprising a frame assembly and wherein the seat further comprises a seat positioning system configured to latch said seat to said frame assembly at a plurality of heights above a surface upon which said frame assembly is supported.

Example 14

The infant-supporting chair of Example 13, wherein the seat positioning system comprises a first seat latching assembly on the seat and being configured to selectively latchingly engage a corresponding portion of the frame assembly in any one of a plurality of discrete latching locations corresponding to the plurality of heights. The infant-supporting chair further comprises a second seat latching assembly on the seat and being configured to selectively latchingly engage another corresponding portion of the frame assembly in another one of another plurality of discrete latching locations that correspond to the plurality of latching locations.

Example 15

The infant-supporting chair of Examples 1, 2, 3, 4, 5, 6, 7, 8, 9, 10, 11, 12, 13 or 14, wherein the tray assembly comprises at least one utensil retainer configured to releasably retain at least one utensil on a tray surface of the tray assembly.

Example 16

The infant-supporting chair of Examples 1, 2, 3, 4, 5, 6, 7, 8, 9, 10, 11, 12, 13, 14 or 15, further comprising a tray liner that is releasably coupled to the tray assembly and is configured to cover an upper surface of the tray assembly when coupled thereto.

Example 17

The infant-supporting chair of Examples 1, 2, 3, 4, 5, 6, 7, 8, 9, 10, 11, 12, 13, 14, 15 or 16, further comprising further comprising a multiple piece restraint system that is operably supported on the seat. The multiple pieces of the multiple piece restraint system are selectively movable between latched and unlatched orientations. The infant-supporting chair further comprises means or apparatus for releasably retaining portions of the multiple piece restraint system in predetermined locations when the multiple pieces are in the unlatched orientations.

Example 18

An infant supporting chair that comprises a frame assembly and a seat that is movably supported on the frame assembly. The seat assembly comprises a first armrest that supports at least one first armrest magnet feature and a second armrest that supports at least one second armrest magnet feature. The infant-supporting chair further comprises a seat positioning system that is configured to latch the seat to the frame assembly at any one of a plurality of predetermined heights above a surface upon which the frame assembly is supported. The seat positioning system comprises first and second seat latching assemblies that must be actuated to permit movement of the seat relative to the frame assembly. The infant-supporting chair further comprises a tray assembly that comprises at least one first tray magnet feature that is oriented to establish magnetic attraction with the at least one first armrest magnet feature and at least one second tray magnet feature that is oriented to establish other magnetic attraction with the at least one second armrest magnet feature.

Example 19

The infant-supporting chair of Example 18, further comprising a multiple piece restraint system operably supported on the seat. The multiple pieces are selectively movable between latched and unlatched orientations.

Example 20

An infant-supporting chair, comprising a seat and a tray assembly. The tray assembly comprises a releasable mechanical latching system for retainingly engaging the tray assembly to the seat when the tray assembly is in a latching position. The infant-supporting chair further comprises at least one tray guidance system that is configured to guide the tray assembly into the latching position. The tray guidance system comprises at least one magnet feature in the seat and at least one other magnet feature in the tray assembly.

Although the various embodiments of the devices have been described herein in connection with certain disclosed embodiments, many modifications and variations to those embodiments may be implemented. Also, where materials are disclosed for certain components, other materials may be used. Furthermore, according to various embodiments, a single component may be replaced by multiple components, and multiple components may be replaced by a single component, to perform a given function or functions. In addition, features disclosed in connection with one embodiment may be employed with other embodiments disclosed herein. The foregoing description and following claims are intended to cover all such modification and variations.

While this invention has been described as having exemplary designs, the present invention may be further modified within the spirit and scope of the disclosure. This application is therefore intended to cover any variations, uses, or adaptations of the invention using its general principles.

Any patent, publication, or other disclosure material, in whole or in part, that is said to be incorporated by reference herein is incorporated herein only to the extent that the incorporated materials do not conflict with existing definitions, statements, or other disclosure material set forth in the disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An infant-supporting chair, comprising:
a seat comprising a first magnetic element; and
a tray releasably mountable to said seat, wherein said tray comprises:
  a latch; and
  a second magnetic element, wherein said first magnetic element and said second magnetic element are configured to draw said tray toward an engaged position when said tray is in a range of positions relative to said seat that are sufficient to establish a magnetic attraction between said first magnetic element and said second magnetic element, wherein said tray further comprises a second latch, wherein said latch and said second latch are configured to releasably engage said seat, and wherein said tray further comprises a release actuator configured to simultaneously disengage said latch and said second latch from said seat upon application of an actuation force to said release actuator.

2. The infant-supporting chair of claim 1, wherein said tray further comprises a planar bottom surface comprising a plurality of feet.

3. The infant-supporting chair of claim 1, wherein said seat further comprises a ferromagnetic material.

4. The infant-supporting chair of claim 1, wherein said tray further comprises a ferromagnetic material.

5. The infant-supporting chair of claim 1, further comprising a restraint system operably supported on said seat, said restraint system being selectively movable between latched and unlatched orientations.

6. An infant-supporting chair, comprising:
a seat comprising a first magnetic element;
a tray releasably mountable to said seat, wherein said tray comprises:
  a latch; and
  a second magnetic element, wherein said first magnetic element and said second magnetic element are configured to draw said tray toward an engaged position when said tray is in a range of positions relative to said seat that are sufficient to establish a magnetic attraction between said first magnetic element and said second magnetic element; and
a restraint system operably supported on said seat, said restraint system being selectively movable between latched and unlatched orientations, and wherein said restraint system is configured to releasably engage an adjustable restraint post located on a base of said seat.

7. The infant-supporting chair of claim 6, wherein said adjustable restraint post is configured to move between a front position and a rear position relative to a back of said seat.

8. An infant-supporting chair, comprising:
a seat comprising a magnetic element; and
a tray releasably mountable to said seat, wherein said tray comprises:
  a latch; and
  a ferromagnetic material, wherein a magnetic attraction between said magnetic element and said ferromagnetic material is configured to draw said tray toward an engaged position when said tray is in a range of positions relative to said seat that are sufficient to establish the magnetic attraction between said magnetic element and said ferromagnetic material, wherein said tray further comprises a second latch, wherein said latch and said second latch are configured to releasably engage said seat, and wherein said tray further comprises a release actuator configured to simultaneously disengage said latch and said second latch from said seat upon application of an actuation force to said release actuator.

9. The infant-supporting chair of claim 8, wherein said tray further comprises at least one magnetic element.

10. The infant-supporting chair of claim 8, wherein said seat further comprises a ferromagnetic material.

11. The infant-supporting chair of claim 8, wherein said tray further comprises a planar bottom surface comprising a plurality of feet.

* * * * *